US012533577B2

(12) United States Patent
Lee et al.

(10) Patent No.: US 12,533,577 B2
(45) Date of Patent: Jan. 27, 2026

(54) HANDGUN SIMULATION ASSEMBLY WITH MATING CRADLE FOR VIRTUAL REALITY CONTROLLER

(71) Applicant: AceXR, LLC, Reno, NV (US)

(72) Inventors: Mann Howe Aaron Lee, London (GB); David Spencer Clark, Saratoga Springs, UT (US); Brian Phillips, Neptune Beach, FL (US)

(73) Assignee: AceXR, LLC, Carrollton, TX (US)

( * ) Notice: Subject to any disclaimer, the term of this patent is extended or adjusted under 35 U.S.C. 154(b) by 284 days.

(21) Appl. No.: 18/496,133

(22) Filed: Oct. 27, 2023

(65) Prior Publication Data

US 2024/0139619 A1 May 2, 2024

Related U.S. Application Data

(60) Provisional application No. 63/419,999, filed on Oct. 27, 2022.

(51) Int. Cl.
*A63F 13/245* (2014.01)
*A63F 13/285* (2014.01)
(Continued)

(52) U.S. Cl.
CPC .......... *A63F 13/285* (2014.09); *A63F 13/245* (2014.09); *A63F 13/53* (2014.09);
(Continued)

(58) Field of Classification Search
None
See application file for complete search history.

(56) References Cited

U.S. PATENT DOCUMENTS

D614,624 S * 4/2010 Zhang .......................... D21/333
8,057,309 B1 * 11/2011 Mead .................... A63F 13/837
463/47

(Continued)

FOREIGN PATENT DOCUMENTS

CN 206276025 6/2017
CN 110538453 12/2019

(Continued)

OTHER PUBLICATIONS

International Search Report and Written Opinion received for counterpart International Application No. PCT/US2023/078023 mailed Feb. 20, 2024 (10 pages).

(Continued)

*Primary Examiner* — Tramar Harper
(74) *Attorney, Agent, or Firm* — Perkins Coie LLP

(57) ABSTRACT

A handgun simulation assembly that mates a virtual reality (VR) controller having a trigger finger button with a handgun grip and trigger in order to better simulate the feel of a typical handgun for a VR environment. The handgun simulation assembly includes a handgun body with a mating cradle that is designed to receive and hold a VR controller. The mating cradle has an engaged position where the VR controller is affixed to the handgun body and an unengaged position where the VR controller is released. When the mating cradle is in the engaged position, the VR controller can be oriented such that the trigger finger button is positioned downward, and the control pad is positioned rearward and facing the user. The mating cradle allows various subassemblies to access the buttons on the VR controller to provide a more realistic handgun experience when in a VR environment.

20 Claims, 21 Drawing Sheets

(51) Int. Cl.
*A63F 13/53* (2014.01)
*A63F 13/837* (2014.01)
*F41A 33/00* (2006.01)
*F41A 33/02* (2006.01)

(52) U.S. Cl.
CPC .... *A63F 13/837* (2014.09); *A63F 2300/8082* (2013.01); *F41A 33/00* (2013.01); *F41A 33/02* (2013.01)

(56) References Cited

U.S. PATENT DOCUMENTS

| | | | | |
|---|---|---|---|---|
| 10,744,406 | B2 * | 8/2020 | Ham | G06F 3/033 |
| 11,395,960 | B2 * | 7/2022 | Ham | G06F 3/011 |
| 11,577,173 | B2 * | 2/2023 | Armand | A63F 13/98 |
| 2003/0013524 | A1 * | 1/2003 | Cochran | A63F 13/219 463/37 |
| 2007/0021210 | A1 * | 1/2007 | Tachibana | A63F 13/245 463/37 |
| 2008/0015017 | A1 * | 1/2008 | Ashida | A63F 13/803 463/37 |
| 2008/0064500 | A1 * | 3/2008 | Satsukawa | A63F 13/98 320/137 |
| 2008/0146336 | A1 * | 6/2008 | Feldman | A63F 13/24 463/37 |
| 2010/0267454 | A1 * | 10/2010 | Navid | A63F 13/24 463/37 |
| 2011/0092290 | A1 * | 4/2011 | Huebner | A63F 13/5255 463/39 |
| 2011/0306424 | A1 * | 12/2011 | Kazama | A63F 13/98 463/37 |
| 2012/0122576 | A1 * | 5/2012 | Mao | A63F 13/245 463/32 |
| 2012/0302348 | A1 * | 11/2012 | Karacal | A63F 13/837 463/38 |
| 2020/0346108 | A1 * | 11/2020 | Blackburn | G06F 3/011 |
| 2022/0047940 | A1 | 2/2022 | Armand | |
| 2023/0294004 | A1 | 9/2023 | O'Dowd et al. | |

FOREIGN PATENT DOCUMENTS

| | | | | | |
|---|---|---|---|---|---|
| CN | 210674201 | | | 6/2020 | |
| KR | 101759037 | B1 | * | 7/2017 | A63F 13/219 |
| KR | 20180079953 | A | * | 7/2018 | A63F 13/219 |
| WO | WO-2022086361 | A1 | * | 4/2022 | F41A 33/00 |
| WO | 2023064762 | | | 4/2023 | |

OTHER PUBLICATIONS

The Most Realistic Hitting Experience [online]. WIN Reality, LLC, 2023 [retrieved on Feb. 28, 2024]. Retrieved from the Internet: <URL: https://winreality.com/equipment>.

Sense Arena ATP Tour: Official VR Tennis Training Tool [online]. Sense Arena, 2024 [retrieved on Feb. 28, 2024]. Retrieved from the Internet: <URL: https://tennis.sensearena.com/store/equipment>.

GAIM Hunting Shooting Simulator [online]. GAIM Immersive Technology Group AB, 2024 [retrieved on Feb. 28, 2024]. Retrieved from the Internet: <URL: https://www.gaim.com/shooting-simulators/gaim-hunting>.

GAIM Sport Shooting Simulator [online]. GAIM Immersive Technology Group AB, 2024 [retrieved on Feb. 28, 2024]. Retrieved from the Internet: <URL: https://www.gaim.com/shooting-simulators/gaim-sport-shooting>.

* cited by examiner

HANDGUN SIMULATION ASSEMBLY WITH MATING CRADLE FOR VIRTUAL REALITY CONTROLLER

CROSS-REFERENCE TO RELATED APPLICATION(S)

The present application claims the benefit of U.S. Provisional Application No. 63/419,999, filed Oct. 27, 2022, the disclosure of which is incorporated herein by reference in its entirety.

BACKGROUND

A major appeal of virtual reality (VR) games is that they allow users to immerse themselves in the game world. When playing VR shooting games, users typically hold the VR controller in their hand and click the buttons on the controller with their fingers. However, this fails to provide a realistic shooting experience because VR controllers are not specifically designed for shooting games. Particularly in VR environments that are designed to simulate a real shooting experience, the use of a plastic VR controller to simulate a handgun fall well short of the experience expected by a professional or semi-professional. Such VR environments include virtual target ranges used for training or competition, or virtual training environments that allow professionals like the police or the military to safely participate in different tactical situations. Even with a VR headset that completely takes over their field of vision, holding a controller that does not have the weight or feel of a handgun or other hand-held weapon can lead to a detached VR experience and sub-optimal user training. Therefore, there is a need for a VR controller accessory that can simulate the feeling of holding and using a real handgun, while translating user inputs on the accessory to appropriate inputs on virtual reality controllers typically manufactured by large consumer electronics companies.

BRIEF DESCRIPTION OF THE DRAWINGS

Embodiments of the handgun simulation assembly introduced herein may be better understood by referring to the following Detailed Description in conjunction with the accompanying drawings, in which like reference numerals indicate identical or functionally similar elements.

Figure 1A:
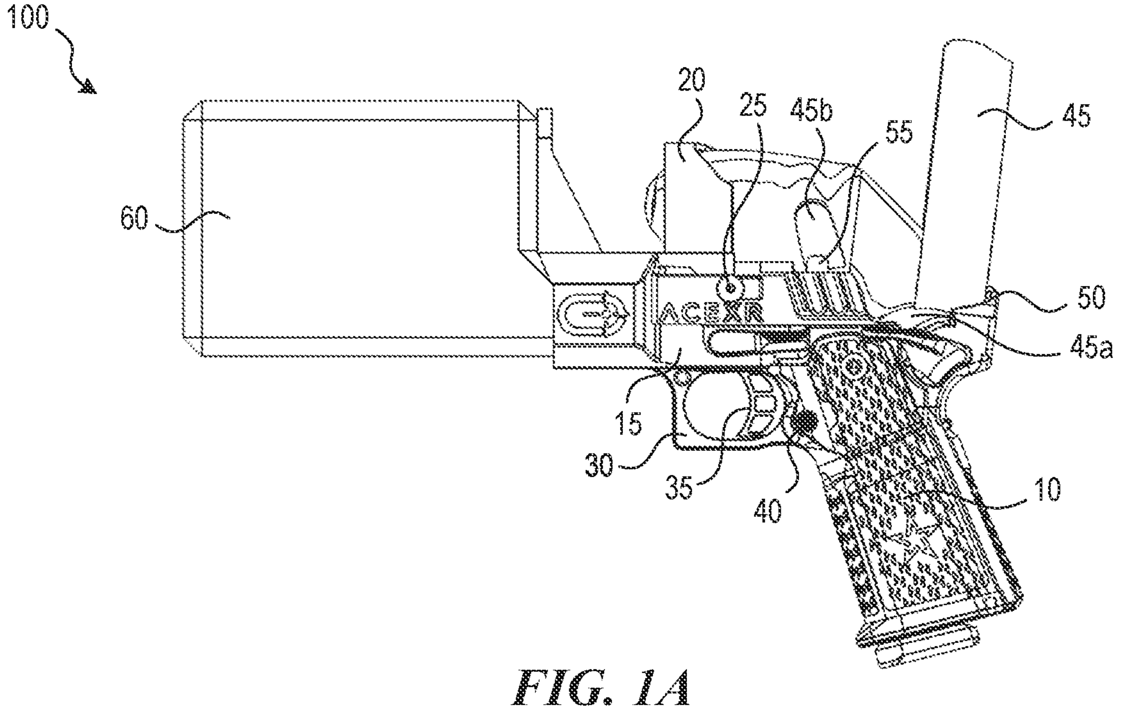
FIGS. 1A and 1B are side and isometric views of a handgun simulation assembly of an embodiment of the present technology.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments.

DETAILED DESCRIPTION

A handgun simulation assembly that mates a virtual reality (VR) controller having a trigger finger button with a handgun grip and trigger in order to better simulate the feel of a typical handgun for a VR environment is disclosed herein. The handgun simulation assembly includes a handgun body having a grip and a trigger blade disposed on a lower portion of the body. The upper portion of handgun body includes a mating cradle that is designed to receive and hold a VR controller manufactured by a third party, such as the Meta Quest™ VR controllers manufactured by Meta Platforms, Inc. (formerly Facebook, Inc.). The mating cradle moves between an engaged position and an unengaged position. When the mating cradle is in the engaged position, the VR controller is affixed to the handgun body in a horizontal orientation, with the trigger finger button of the virtual reality controller oriented towards the handgun grip. When in the unengaged position the virtual reality controller is separable from the handgun body and can be recharged or replaced. The handgun body includes a trigger translation subassembly for translating the horizontal translational motion of a trigger blade pull to a vertical translational action to depress the trigger finger button of the VR controller. A tensioning mechanism is incorporated in the trigger translation subassembly to simulate the feel of trigger resistance that is found in a physical handgun. By mating commercially available VR controllers with realistic handgun grips and triggers, users of the handgun simulation assembly are provided with a more realistic handgun experience when in a VR environment.

In some embodiments, the handgun simulation assembly includes a cradle subassembly. The cradle subassembly includes a mating cradle for engaging the VR controller and a sliding member with an arm that extends to a location adjacent a joystick of the VR controller. The arm translates the motion associated with a user pulling the sliding member to the joystick. Application software operating in the VR environment can interpret the resulting movement of the joystick as a command to release a virtual slide from the VR handgun.

In some embodiments, a firearm simulation assembly includes a firearm assembly frame and a swappable firearm body releasably coupled to the firearm assembly frame. The firearm assembly frame engages and supports the VR controller, and houses functional components such as a trigger translation subassembly and a magazine release translation subassembly. The swappable firearm body can have a shape and weight balance corresponding to various types of firearms, such as pistols, rifles, shotguns, etc. The swappable firearm body can be swapped with another to match the type of firearm being used in the VR space.

Various features of the handgun simulation assembly introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description. For purposes of simplicity of discussion, the handgun simulation assembly will be described herein with reference to top and bottom, upper and lower, above and below, and/or left or right relative to the spatial orientation of the embodiment(s) shown in the figures. It is to be understood that the handgun simulation assembly, however, can be moved to and used in different spatial orientations without changing the structure of the system.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Figure 1B:
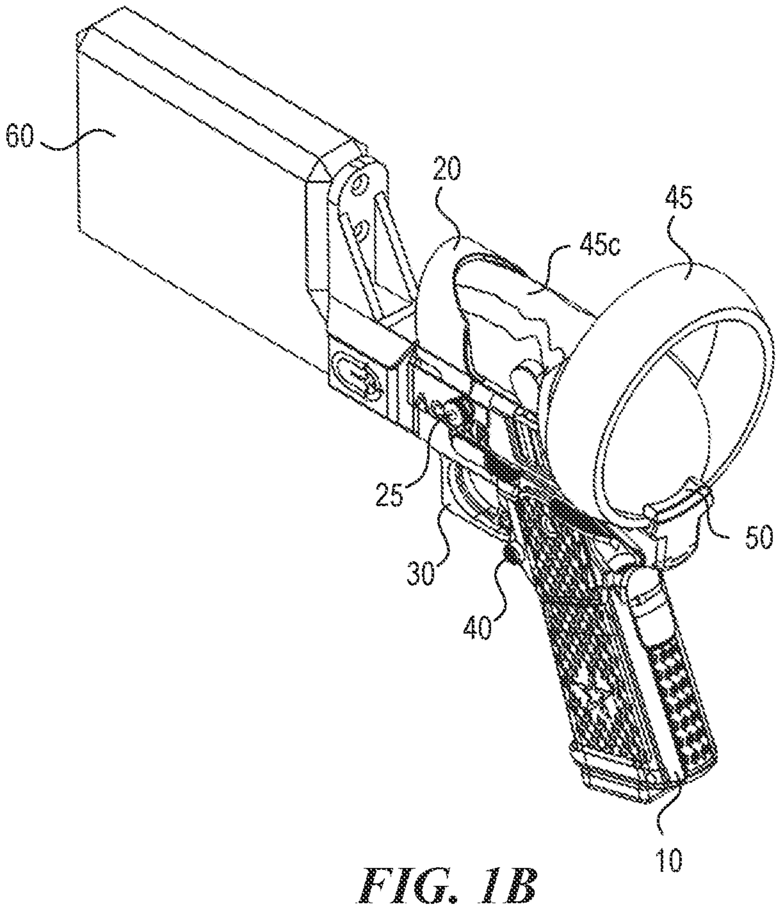

FIGS. 1A and 1B are side and isometric views of the handgun simulation assembly 100 of an embodiment of the present technology. The handgun simulation assembly 100 includes a handgun grip 10, a handgun body 15, a mating cradle 20, and a cradle locking subassembly 25. The handgun body 15 includes a trigger guard 30 and trigger blade (or "trigger") 35 extending from the lower portion of the handgun body. The handgun body 15 also includes a magazine release button 40 located adjacent to the trigger 35. The handgun grip 10, trigger guard 30, trigger 35, and magazine release button 40 may be manufactured with similar materials, finish, and feel as might be found on operational handguns.

The handgun body 15 is configured to support a VR controller 45 manufactured by a third party, such as a Meta Quest Pro™, Meta Quest 2™, or Meta Quest 3™, sold by Meta Platforms, Inc., a Pico 4™ sold by Pico Immersive Pte. Ltd., or other similar controller. When entering a virtual environment, a user typically wears a virtual reality headset (to cover the user's eyes) and holds VR controllers in both the left and right hands. Application software running on the virtual reality headset and in connected computer servers generate different virtual reality environments for the user to explore and interact with. The user controls movement and actions in the VR environment based on motion of the virtual reality headset and motion, button, and joystick controls contained on the VR controller. As will be described in additional detail herein, the VR controller 45 is secured on top of the handgun body 15 by the operation of a mating cradle 20. The mating cradle is ring-shaped, and designed to fit around the handle of the VR controller 45 to secure one end of the VR controller. The other end of VR controller 45 is secured by a lip 50 formed on the handgun body 15. The VR controller 45 typically has a trigger finger button 45*a* disposed on the front of the VR controller and operated by the index finger of a user, a side button 45*b* disposed on the side of the VR controller and operated by the thumb of the user, as well as a handle 45*c* for the user to hold.

As will be described with respect to FIGS. 8A and 8B, in some embodiments the handgun simulation assembly 100 also has a magazine release translation assembly which translates a user's pushing force on the magazine release button 40 to a pushing force on the side button 45*b* via an arm 55 that extends upward to a position adjacent the side button. When paired with appropriate virtual reality application software, depressing the side button 45*b* may be interpreted to begin a reload process of the handgun within a virtual reality application.

In some embodiments, the handgun simulation assembly 100 also includes a recoil simulator 60 affixed to the front of the handgun body 15. The recoil simulator 60 is a battery powered device that, when triggered by a Bluetooth or other wireless signal from a linked VR software application, generates a recoil that simulates the feel of a bullet being fired from a physical handgun. Recoil simulators are commercially available on the market from companies like ProTubeVR, which sells the ProVolver™ haptic VR pistol which incorporates such a recoil simulator.

The handgun simulation assembly 100 advantageously allows a user to view and/or access the control panel (e.g., including a joystick and other input buttons) while holding the handgun simulation assembly 100, such as when pointing the handgun simulation assembly 100 forward during a VR gaming session. Moreover, while the illustrated embodiment depicts a left-handed controller, one skilled in the art will appreciate that select components of the handgun simulation assembly 100 described herein can be inverted and/or rearranged to support a right-handed controller.

While one configuration of the handgun simulation assembly 100 is depicted in FIGS. 1A and 1B, it will be appreciated that different configurations of the handgun simulation assembly may be manufactured to simulate the feel or configuration of different types of handguns or long guns. Different pistol grips, triggers, recoil simulators, etc. may be selected to mirror different physical gun types that are available in the real world, and different materials, finishes, and overall assembly weight may be selected to make the handgun simulation assembly closely approximate the feel of a physical gun. As such, the particular configuration depicted in FIGS. 1A and 1B is merely representative of how the handgun simulation assembly 100 might actually look.

Figure 2:
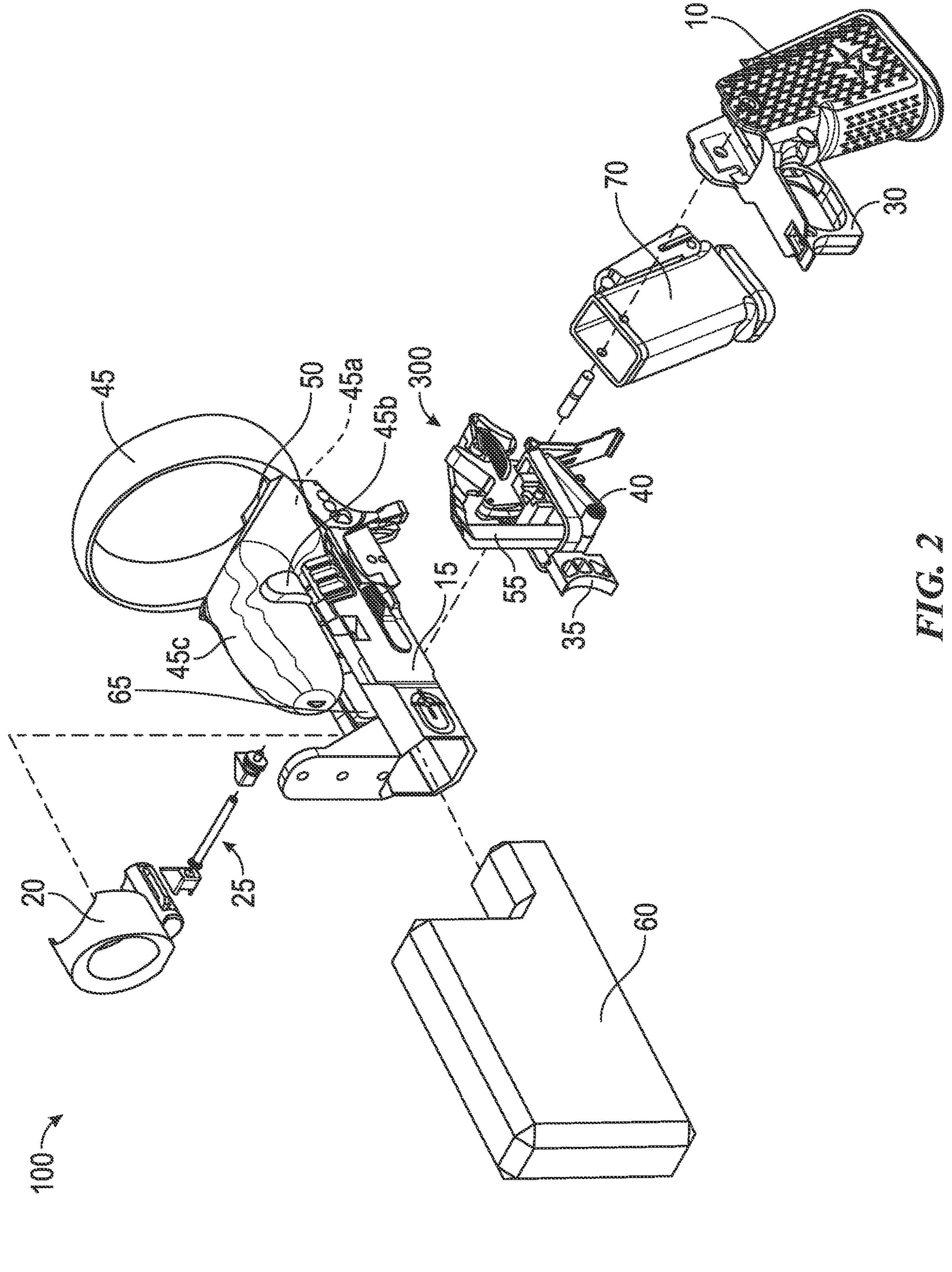
FIG. 2 is a partially exploded isometric view of the handgun simulation assembly of FIG. 1A.

FIG. 2 is a partially exploded isometric view of the handgun simulation assembly 100, depicting various components and subassemblies that are coupled to the handgun body 15. A channel 65 is formed in the upper portion of the handgun body 15. The channel 65 is sized to receive a lower portion of the mating cradle 20. The mating cradle 20 is secured in the channel 65 via the cradle locking subassembly 25, which will be described in additional detail with respect to FIG. 5. The handgun body 15 is coupled to the recoil simulator 60 at the front of the body via a bolt or other fastener, and the body is also coupled to the handgun grip 10 at the bottom via a bolt or other fastener. The grip may include a compartment 70 for a counterweight for simulation purposes. By selection of different counterweights, the weight of the handgun simulation assembly may be configured to match that of various different types of physical handguns.

One of the notable challenges of mating a physical gun configuration with a VR controller is translating typical handgun actions, such as pulling a trigger or ejecting a magazine, to appropriate input of the controller which has a different configuration and a different button feel compared to a physical gun. In order to perform one type of translation, the handgun simulation assembly 100 includes a trigger translation subassembly 300, which translates the user's pulling force on the trigger 35 into a pushing force on the trigger finger button 45*a*. The operation of the trigger translation subassembly 300 will be described in additional detail in FIGS. 3 and 4A-4C. The trigger translation subassembly 300 is located inside the handgun grip 10, where the trigger 35 is located, and the handgun body 15, near where the trigger finger button 45*a* is located.

Figure 3:
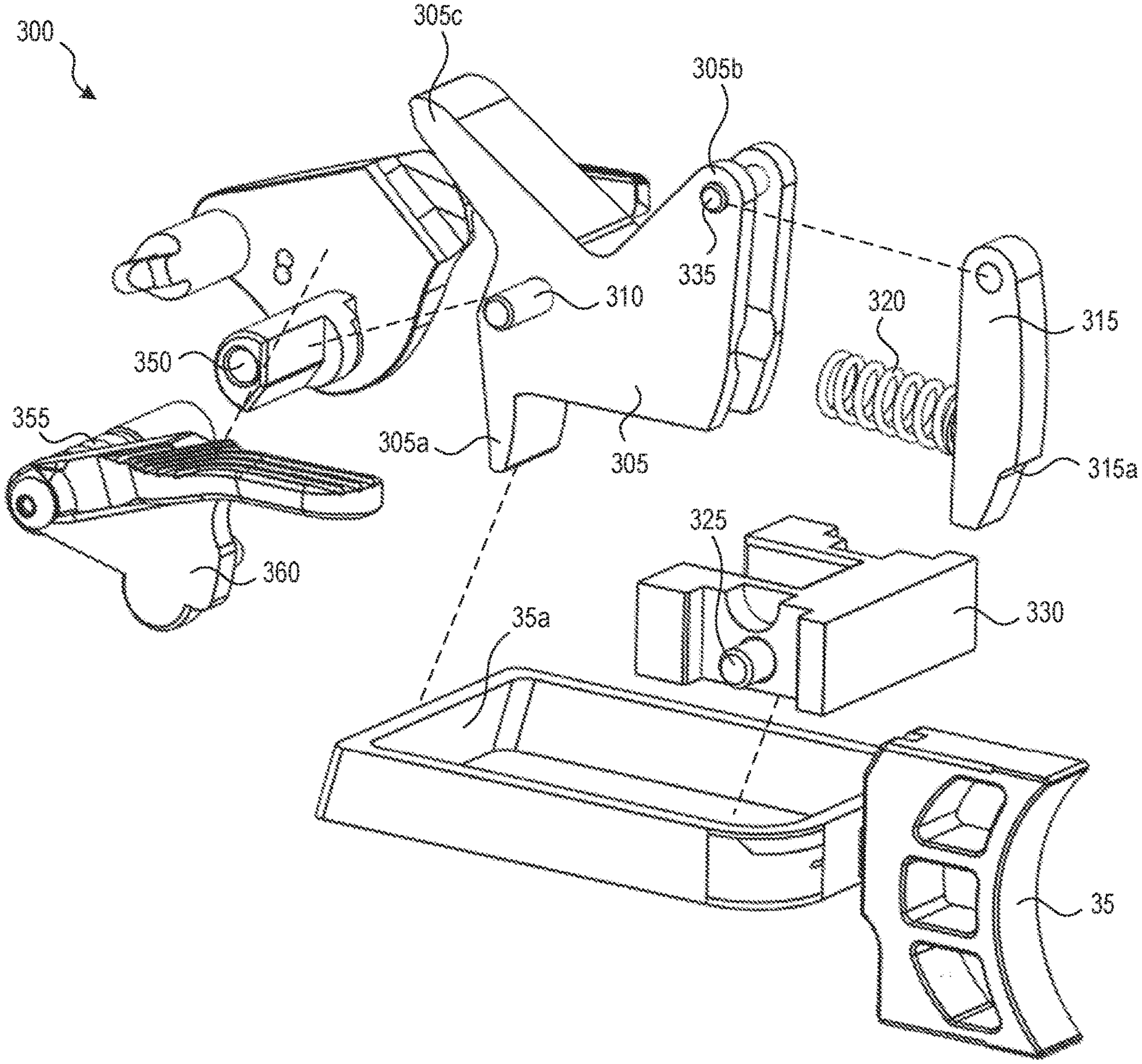
FIG. 3 is a partially exploded isometric view of a trigger translation subassembly of the handgun simulation assembly of FIG. 1A.

FIG. 3 is a partially exploded side view of the trigger translation subassembly 300 which translates trigger motion to a pushing force on the VR controller trigger button in the handgun simulation assembly 100. The trigger translation subassembly 300 includes a cam shaft 310 and a cam 305 rotatably mounted on the cam shaft 310. The cam 305 includes a first portion 305*a* configured to be moved by the trigger 35, a second portion 305*b* configured to mate with a tensioning mechanism, and a third portion 305*c* configured to push against the trigger button of the VR controller. The function of each portion of the cam 305 is described further below. The tensioning mechanism that is coupled to the cam 305 includes a bar 315, a spring 320, a fixture 325, and a block 330. The tensioning mechanism is attached to the cam 305 by a pin 335, which fits into a corresponding receiving hole found on portion 310*b* of the cam 305.

Figure 4A:
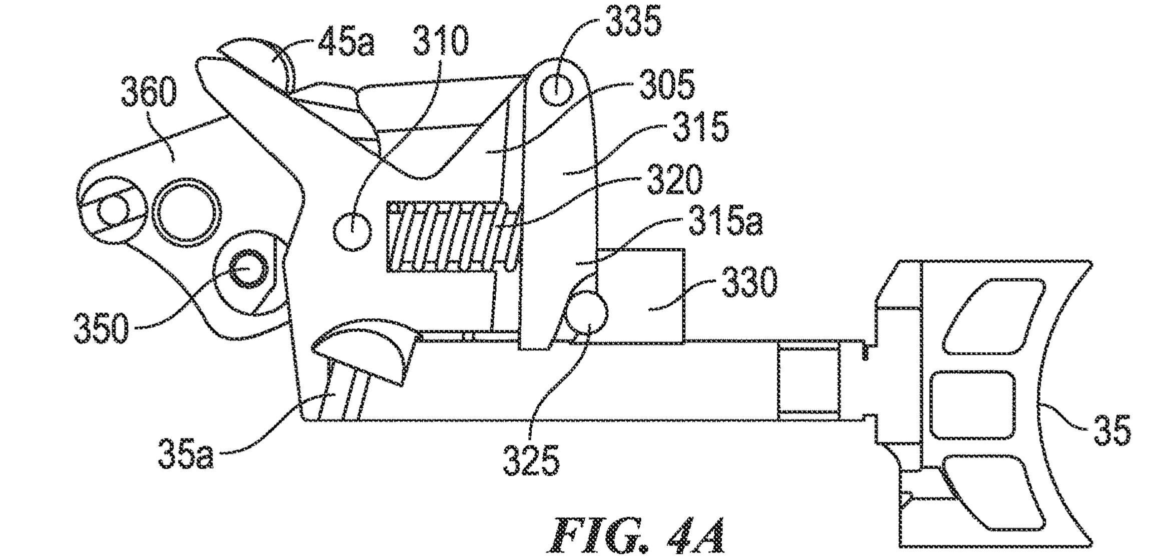
FIGS. 4A, 4B, and 4C are cross-sectional views of the trigger translation subassembly of the handgun simulation assembly of FIG. 1A.
Figure 4B:
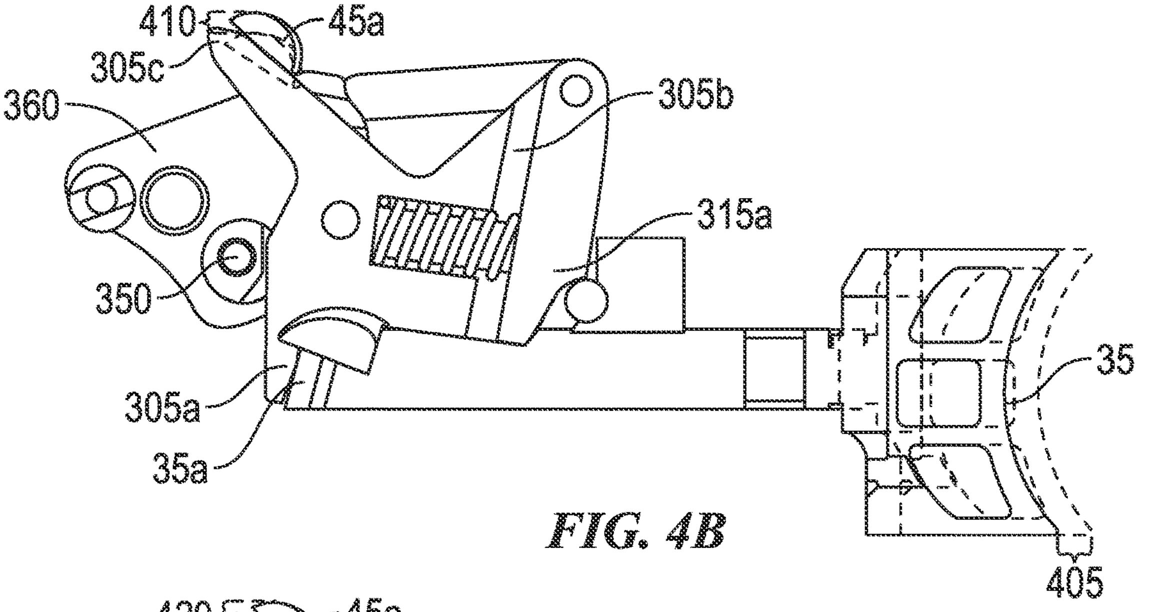
Figure 4C:
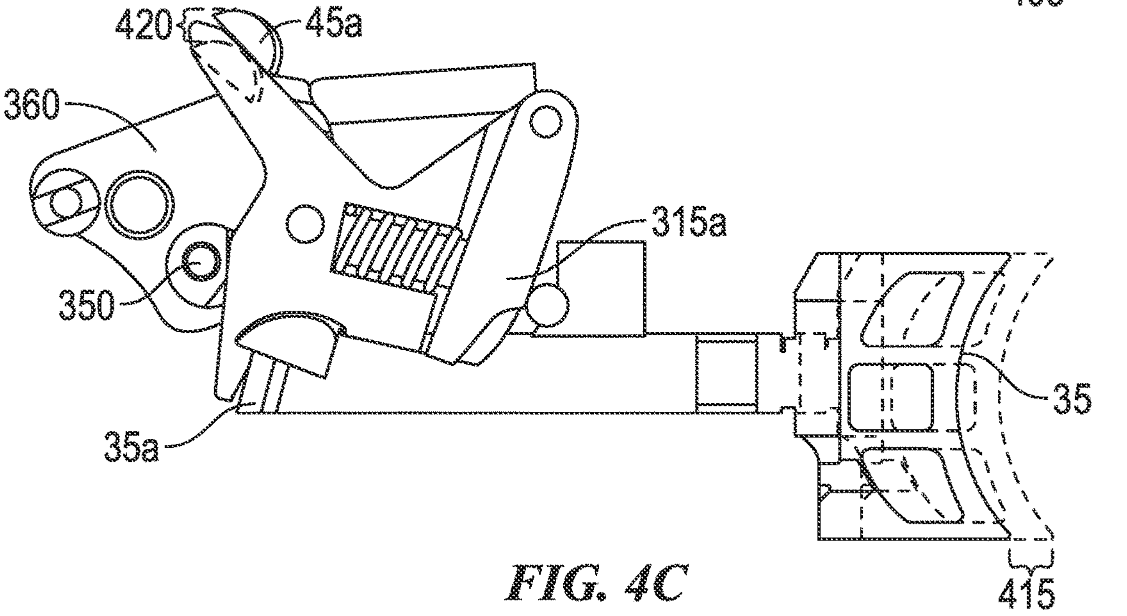

The trigger 35 is moveable in a horizontal direction when depressed by a user. As the trigger moves, a rear end 35*a* of the trigger comes into contact with the first portion 305*a* of the cam 305. A force applied to the first portion 305*a* of the cam 305 causes the cam 305 to rotate around the cam shaft 310, which is fixed in position relative to the handgun simulation assembly 100. As cam 305 rotates around the cam shaft 310 in a clockwise direction, both second portion 305*b* and third portion 305*c* of the cam move at the same rotational rate. The second portion 305*b* of the cam 305 is rotatably connected to bar 315 via the pin 335. The bar 315 is also connected to the cam 305 via the spring 320, which exerts a force to push the bar 315 away from the cam 305. In some embodiments, the spring 320 is housed inside the cam 305, as is depicted in FIGS. 4A-4C. When assembled, bar 315 rests against fixture 325 of block 330, both of which are fixed in position relative to the handgun simulation assembly 100. The bar 315 has a notch 315*a* that is pushed against the fixture 325 due to the force from the spring 320. As cam 305 moves through its range of motion (due to the motion of trigger 35), the shape of the bar 315 causes the pull weight on the trigger 35 that is felt by the user to change. The operation of the tensioning mechanism is best understood by reference to FIGS. 4A, 4B, and 4C.

FIGS. 4A, 4B, and 4C are cross-sectional views of the trigger translation subassembly 300 which depicts the subassembly in three different positions: an initial (neutral) position, an intermediate position, and a terminus (final) position. FIG. 4A illustrates the subassembly 300 when the trigger 35 has not been pulled and is in its neutral position. As depicted in FIG. 4A, when in the neutral position the fixture 325 contacts the bar 315 of the tensioning mechanism at a point approximately midway along the notch 315*a*. The bar 315 is biased against the fixture 325 by the operation of spring 320, which applies a pushing force against the bar 315. Fixture 325 can be made out of a material that Is wear resistant, such as stainless steel or Delrin™ manufactured by DuPont.

When a user wishes to fire the handgun simulation subassembly 100, they pull on trigger 35 (e.g., using their index finger), causing it to move in a direction towards the handgun grip. FIG. 4B depicts the subassembly in an intermediate position, with the trigger having been pulled part way by a user such that it has moved a first distance 405. When pulled part way, the rear end 35*a* of the trigger 35 makes contact with and pushes the first portion 305*a* of the cam 305, causing the cam 305 to rotate around the cam shaft 310 (fixed in position) in a clockwise direction. This rotation causes the second and third portions 305*b* and 305*c* of the cam 305 to move clockwise relative to the cam shaft 310 as well. Due to coupling between the second portion 305*b* of the cam and bar 315 by pin 335, as well as the biasing applied by spring 320, the bar 315 is also moved along with the cam 305. As depicted in FIG. 4B, the bar 315 of the tensioning mechanism has moved such that in an intermediate position the fixture 325 contacts the bar 315 at a point further along notch 315*a*. Due to the notch 315*a* having an increased slope at the point of contact, a greater force is required by the user to move the trigger 35. The notch 315*a* is shaped such that the required force simulates the variable trigger resistance of a physical handgun. In some embodiments, the notch has a shape different from the illustrated embodiment.

As the cam 305 rotates clockwise, the third portion 305*c* of the cam 305 also rotates relative to the cam shaft 310. The third portion 305*c* makes contact with and pushes against the trigger finger button 45*a* of the VR controller 45. In the illustrated embodiment, the trigger finger button 45*a* makes direct contact with the third portion 305*c* of the cam 305. In such a case, the surface of the first portion 305*a* of cam 305 may be coated with a thin aluminum or other conductive coating, since some VR controllers have capacitive sensors to distinguish between a touch by a human finger and a touch by an inanimate object. In other embodiments, the contact may be indirect. In either case, the trigger translation subassembly 300 is configured to push on the trigger finger button 45*a* as the trigger 35 is pulled by the user. As depicted in FIG. 4B, the trigger finger button 45*a* has moved a second distance 410 by the partial pull of trigger 35. (The phantom trigger finger button in FIG. 4B represents the original trigger finger button position, as seen in FIG. 4A.) It will be appreciated that the first distance 405 and the second distance 410 may be the same or different distances, based on the geometry of cam 305 and the length of the first portion 305*a* and third portion 305*c* of the cam.

FIG. 4C depicts the subassembly in a terminus (final) position, with the trigger having been fully pulled by a user such that it has moved a third distance 415. As depicted in FIG. 4C, the bar 315 of the tensioning mechanism has moved such that in the final position the fixture 325 contacts the bar 315 at a point outside of notch 315*a*. Once the fixture 325 has finished travel in notch 315*a*, there is no further variance required by the user to move the trigger 35. Such a position simulates the feel of a trigger on a physical handgun after a shot has been fired. As also depicted in FIG. 4C, the trigger finger button 45*a* has moved a fourth distance 420 by the full pull of trigger 35. Movement of the finger button 45*a* causes the corresponding handgun in the virtual environment to fire under the control of the application software in the VR environment. By adjusting the geometry of cam 305, the movement of the trigger finger button 45*a* is intended to trigger firing of the corresponding handgun in the virtual environment at or near the same time as the corresponding feel of the trigger 35 changes.

Returning to FIG. 3, in some embodiments, the trigger translation subassembly 300 also includes a safety mechanism that allows a user to switch the handgun simulation assembly 100 into a "safe" position in which the handgun cannot be fired. The safety mechanism includes a safety stop 350, a safety switch spring 355, and a safety switch 360, which the user can use to switch the safety system between an on and an off position. When the safety mechanism is in the on position, the safety stop 350 blocks the rotation of the cam 305 such that the trigger 35 cannot be pulled. The operation of the safety mechanism can be better appreciated with respect to FIGS. 4A, 4B, and 4C. In FIG. 4C, the safety has been applied by the user by pressing downward on the safety switch 360, which causes the safety stop 350 to be brought into contact with a portion of cam 305. In the applied position, the safety stop 350 prevents the motion of cam 305, freezing the position of the trigger and preventing a user of the handgun simulation assembly 100 from firing the VR handgun. In FIGS. 4A and 4B, the safety switch 360 has been released by the user, which causes the safety stop 350 to be removed from contact with a portion of the cam 305. In the released position, the motion of cam 305 is unimpeded, allowing a user of the handgun simulation assembly 100 to use the trigger in normal operation. The safety switch spring 355 (not shown in FIGS. 4A-4C) biases the safety so that the safety mechanism is normally in a released position, thereby requiring user interaction to apply the safety when desired.

Figure 5:
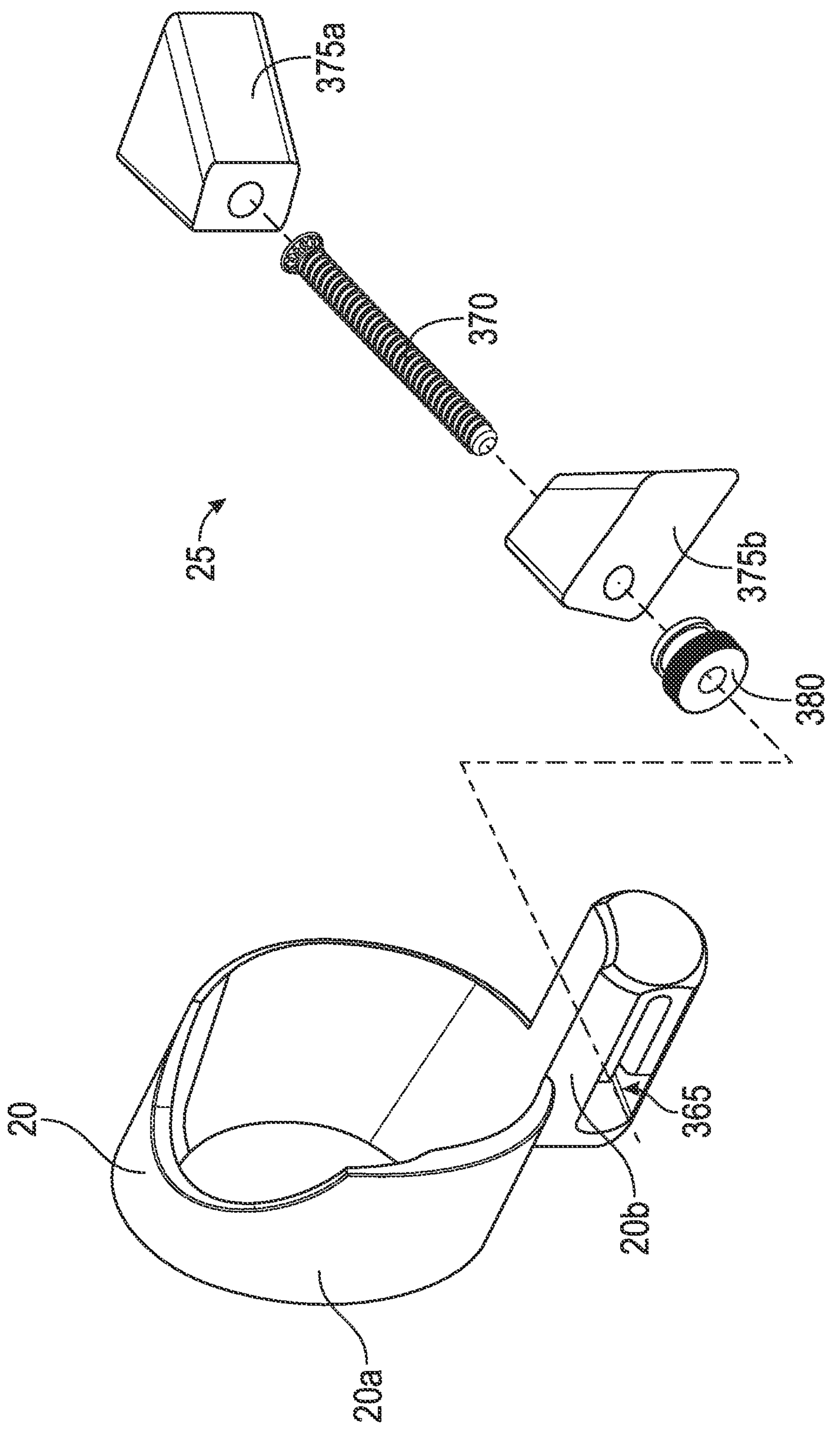
FIG. 5 is a partially exploded isometric view of a mating cradle and a cradle locking subassembly of the handgun simulation assembly of FIG. 1A.

FIG. 5 is a partially exploded isometric view of the mating cradle 20 and the cradle locking subassembly 25 of the handgun simulation assembly 100. The mating cradle 20 has an upper portion 20*a* and a lower portion 20*b*. The upper portion 20*a* is configured to fit around the handle of the VR controller 45. VR controllers 45 are typically asymmetrical, meaning that the left controller handle is shaped for use by a user's left hand and the right controller handle is shaped for use by the user's right hand. For purposes of the handgun simulation assembly 100, it has been determined that a left-handed controller works better for mating with the handgun simulation assembly 100. As such, the upper portion 20*a* is configured to encircle the handle portion of the left-hand controller. Adjustments could be made to the upper portion 20*a* and the simulation assembly 100, however, to allow operation with a right-handed controller as well. The lower portion 20*b* of the mating cradle 20 is configured to slide in the channel 65 of the handgun body 15. The lower portion 20*b* of the mating cradle is formed with a cavity 365 configured to receive the cradle locking subassembly 25, which secures the mating cradle 20 in the channel 65.

In the illustrated embodiment, the cradle locking subassembly 25 comprises a threaded axle 370, a first wedge 375*a*, a second wedge 375*b*, and a compression mechanism 380. In the illustrated embodiment, the axle 370 is threaded on one end and the compression mechanism 380 is a correspondingly threaded thumb nut, sized to attach to the end of the axle 370. In other embodiments, the cradle locking subassembly 25 can be a different kind of fastener assembly.

Figure 6A:
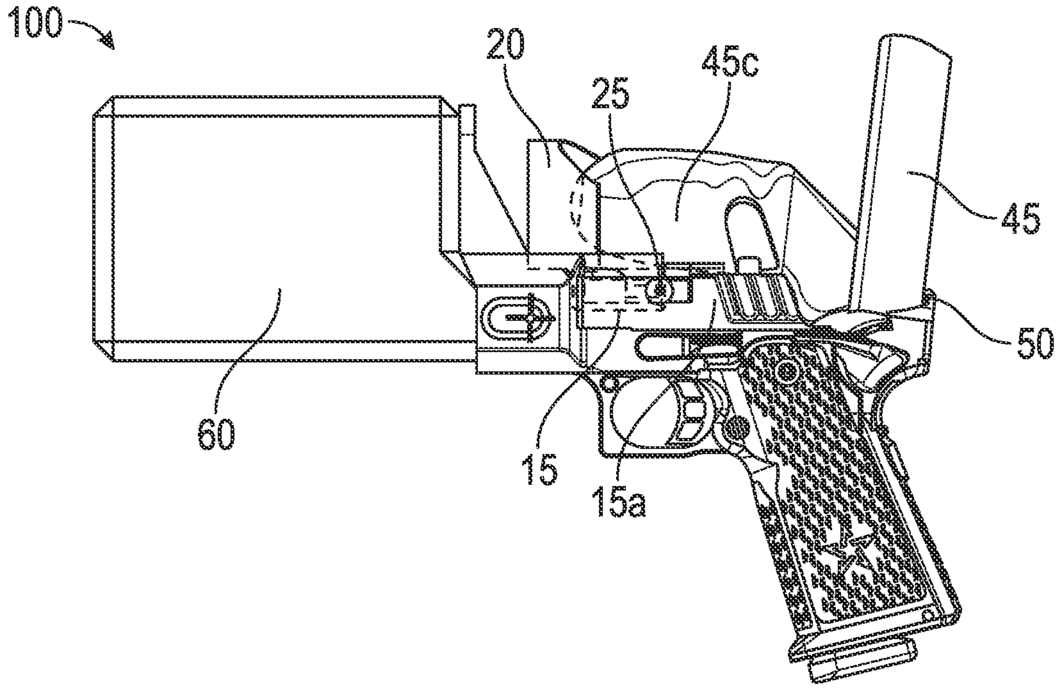
FIGS. 6A and 6B are side views of the mating cradle of the handgun simulation assembly of FIG. 1A in disengaged and engaged positions, respectively.
Figure 6B:
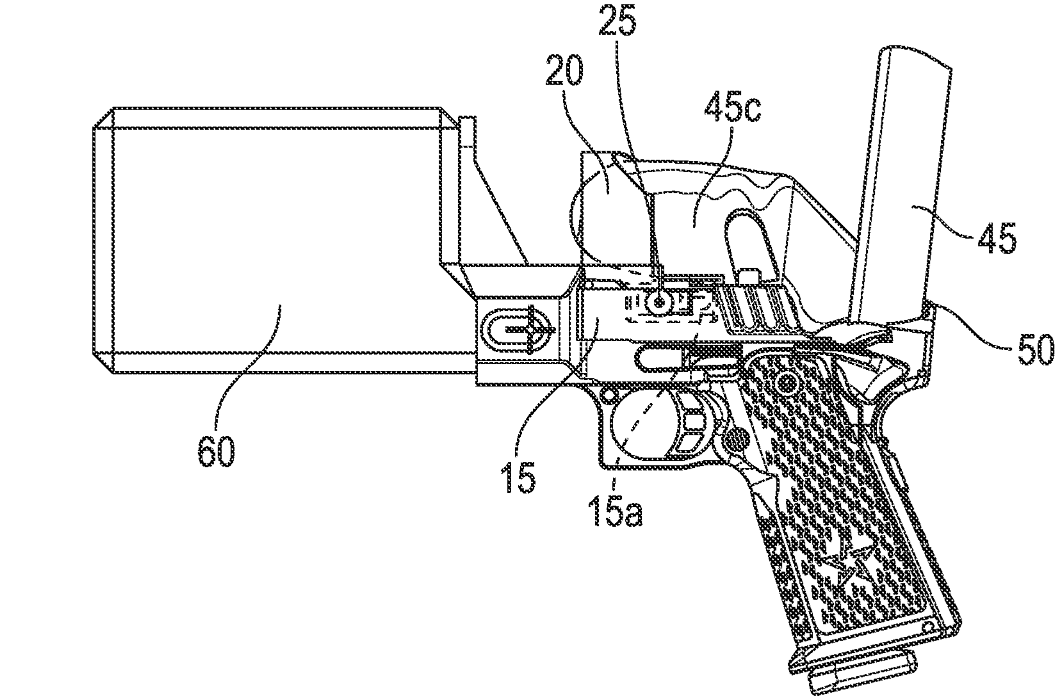

FIGS. 6A and 6B are side views of the handgun simulation assembly 100 that depict operation of the cradle 20 to affix the VR controller 45 to the handgun body 15. The cradle 20 is capable of moving between an unengaged position, in which the VR controller 45 may be removed from the handgun simulation assembly 100, and an engaged position in which the VR controller 45 is affixed to the handgun simulation assembly 100. FIG. 6A illustrates the mating cradle 20 in the unengaged position. In the unengaged position, the mating cradle 20 has been slid forward in the channel 65 towards the recoil simulator 60. Moving the mating cradle 20 forward allows the handle 45*c* of the VR controller to be lifted upward and outward, away from the handgun body 15, and separated from the handgun simulation assembly 100. Doing so allows the VR controller to be recharged, replaced, or used for other purposes without the handgun simulation assembly. In contrast, FIG. 6B illustrates the mating cradle 20 in the engaged position. In the engaged position, the mating cradle 20 has been slid backward in the channel 65, away the recoil simulator 60. Moving the mating cradle 20 backward causes the handle 45*c* of the VR controller to be encircled by the cradle 20. Movement of the mating cradle 20 also causes the top of the VR controller 45 to be pressed against the lip 50 of the handgun body 15. The lip 50 is formed with a slight hook or other protrusion that keeps the top of the VR controller 45 from separating from the handgun simulation assembly 100. Once the mating cradle 20 has been moved to the engaged position, the cradle locking subassembly 25 can be tightened to fix the position of the mating cradle 20, as is depicted in FIG. 7.

Figure 7:
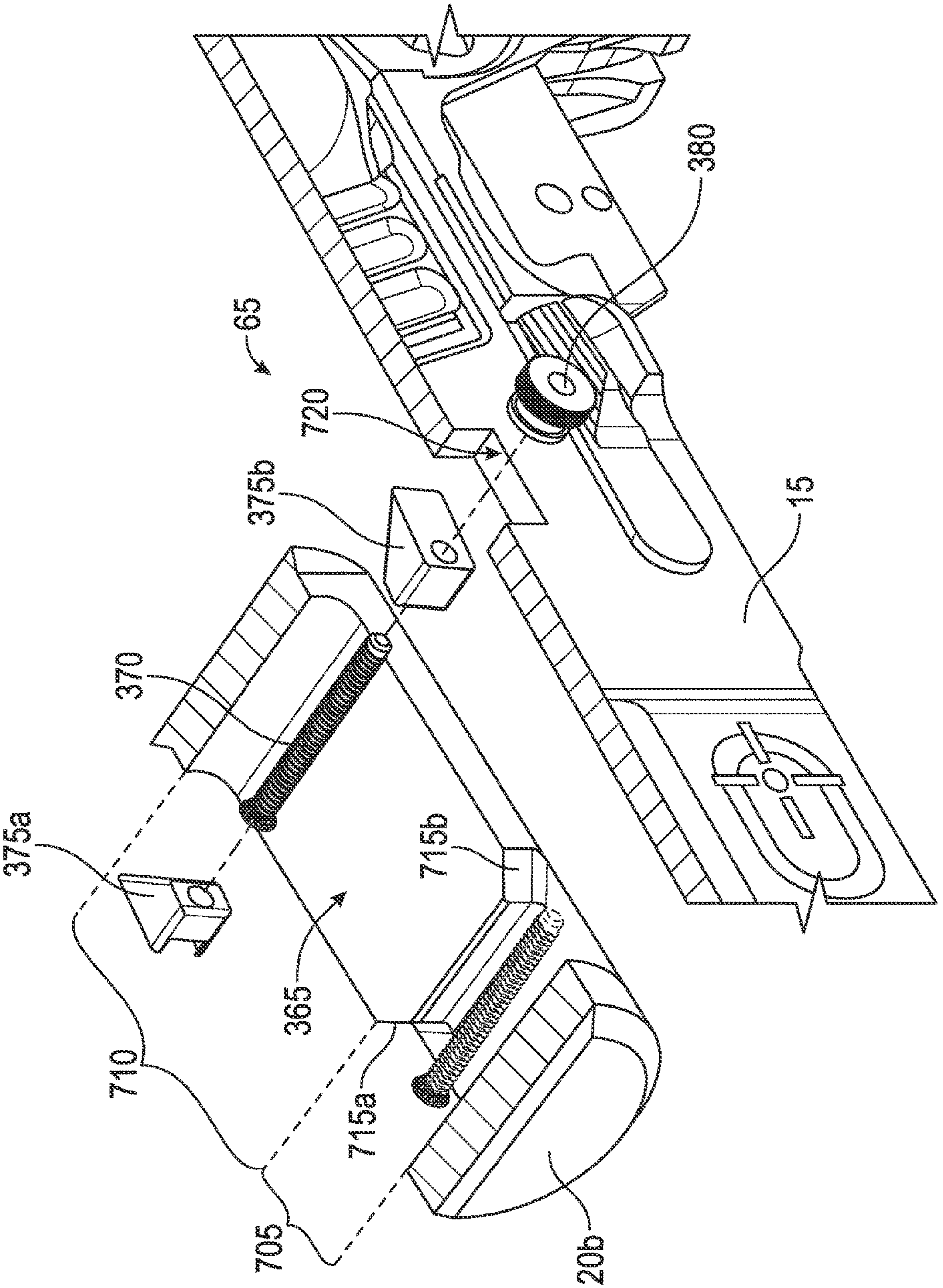
FIG. 7 is a cross-sectional view of the mating cradle and a partially exploded view of the cradle locking subassembly of the handgun simulation assembly of FIG. 1A in disengaged and engaged positions in the handgun body.

FIG. 7 is a cross-sectional view of the handgun body 15, the lower portion 20*b* of the mating cradle 20 and a partially exploded view of the cradle locking subassembly 25 of the handgun simulation assembly 100. As previously described, the mating cradle 20 can move relative to the handgun body 15 between an engaged position and a disengaged position. The cradle is kept in the channel 65 by operation of the axle 50. The axle extends through cavity 365 of the cradle 20 and, as will be further described herein, is affixed to the handgun body 15. When in the engaged position, the axle 50 is in a locking portion 705 of the cavity 365. When in the disengaged position, the axle 50 is in a travelling portion 710 of the cavity 54. In FIG. 7, the axle 50 shown in phantom lines is at the locking portion 705 of the cavity and the axle shown in solid lines is at one end of the travelling portion 710 of the cavity. It will be appreciated, however, that the axle 50 can be at other positions in the cavity 365 depending on how far the mating cradle 20 is slid along the channel 65.

When the cradle 20 has been moved to the engaged position, the cradle locking subassembly 25 is used to secure the cradle in that position. To secure the cradle, compression mechanism 380 is tightened to cause the first wedge 375*a* and the second wedge 375*b* to move towards each other, thereby pinching the lower portion 20*b* of the mating cradle 20 therebetween. In some embodiments, the tightening mechanism 380 is a threaded thumb screw and the axle 50 has a complementary threaded end. Rotating the tightening mechanism thereby causes the wedges to move inwardly. In the depicted embodiment, the lower portion 20*b* of the mating cradle is formed with a first angled receiving face 715*a* and a second angled receiving face 715*b*, with each of the receiving faces angled to be complementary to and configured to mateably engage the corresponding first and second wedges 375*a* and 375*b*. In other words, the compression mechanism 380 biases the first and second wedges 375*a* and 375*b* against the first and second angled receiving faces 715*a* and 715*b*. The first and second wedges 375*a* and 375*b* also fit into notches 720 that are formed on either side of the handgun body 15, thereby fixing the location of the locking subassembly 25 on the handgun body 15. The use of oriented wedges and complementary receiving faces on the mating cradle is advantageous for at least two reasons. When tightening the compression mechanism 380, the mating cradle is forced slightly rearward by pressure of the wedges on the receiving faces, thereby improving the correct positional capture of the VR controller 45 by the mating cradle 20. And when releasing the compression mechanism, any movement of the mating cradle 20 forward in the channel 65 will have a tendency to force the wedges outward to release the mating cradle 20. The depicted configuration allows the mating cradle 20 to be fixed in position relative to the handgun body 15 and secure the VR controller 45.

Figure 8B:
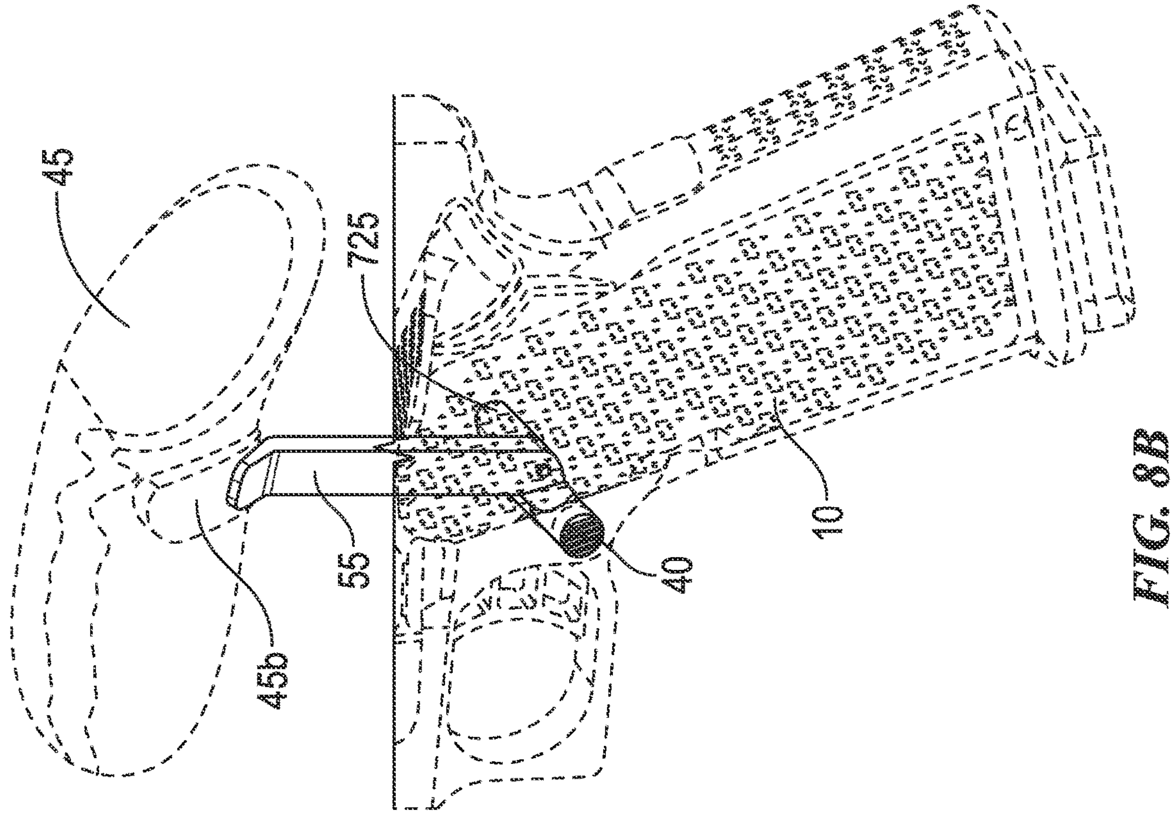
FIGS. 8A and 8B are isometric views of a magazine release translation subassembly of the handgun simulation assembly of FIG. 1A.
Figure 8A:
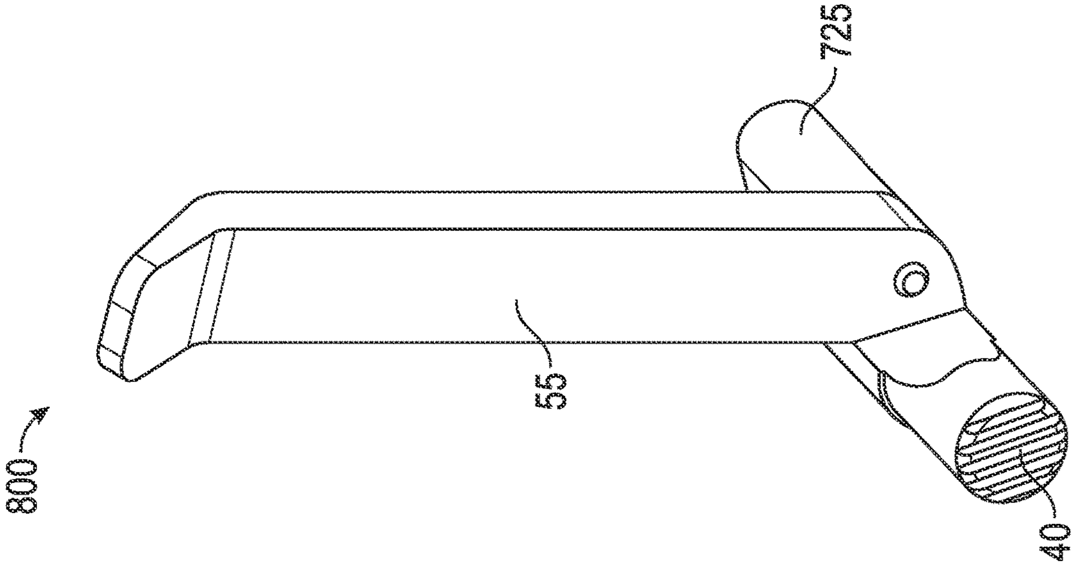

FIGS. 8A and 8B are isometric views of a magazine release translation subassembly 800 of the handgun simulation assembly 100. The magazine release translation subassembly 800 includes the magazine release button 40, the arm 55, and a spring assembly 725 with an internal spring (not shown). The magazine release button 40 has a neutral position and a pushed position. The spring assembly 82 biases the magazine release button 40 towards its neutral position. The arm 55 is coupled to the magazine release button 40 and extends to a location adjacent to the side button 45*b* of the VR controller 45. As the user pushes on the magazine release button 40, the arm 55 is moved in the same direction without rotating. A distal end of the arm 55 makes contact with the side button 45*b* of the VR controller 45, and as the magazine release button 40 is moved to its pushed position, the distal end of the arm 55 pushes the side button 45*b*. The spring assembly 725 either mimics or is identical to the magazine release system used in physical handguns. When the magazine release button is pushed by the spring back to its neutral position, the distal end of the arm 55 releases the side button 45*b*. The magazine release translation subassembly 800 is inside both the handgun grip 10, where the magazine button 40 is located, and the handgun body 15, near where the side button 45*b* is located.

Figure 9A:
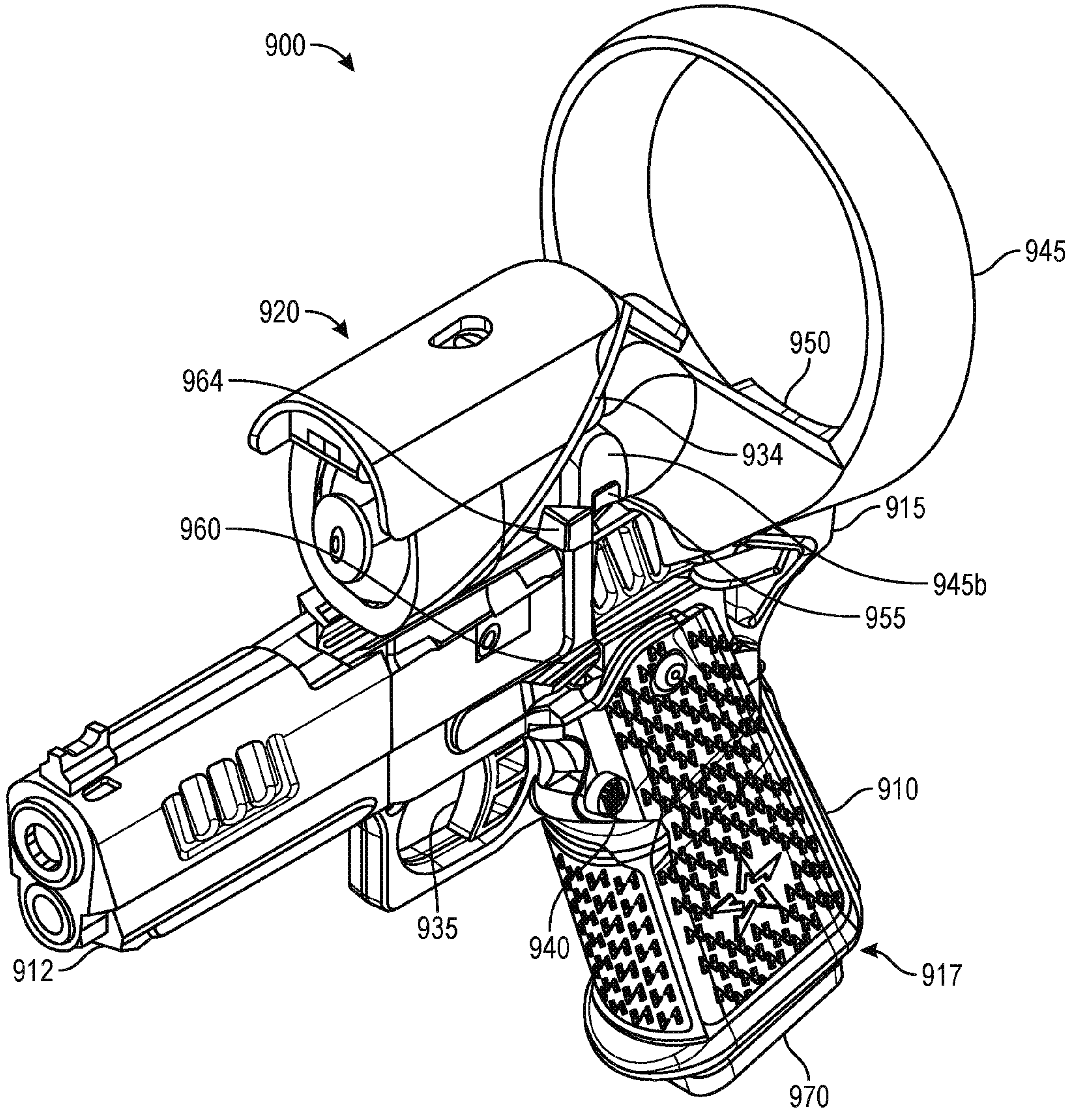
FIGS. 9A and 9B are isometric and side views, respectively, of a handgun simulation assembly of another embodiment of the present technology.
Figure 9B:
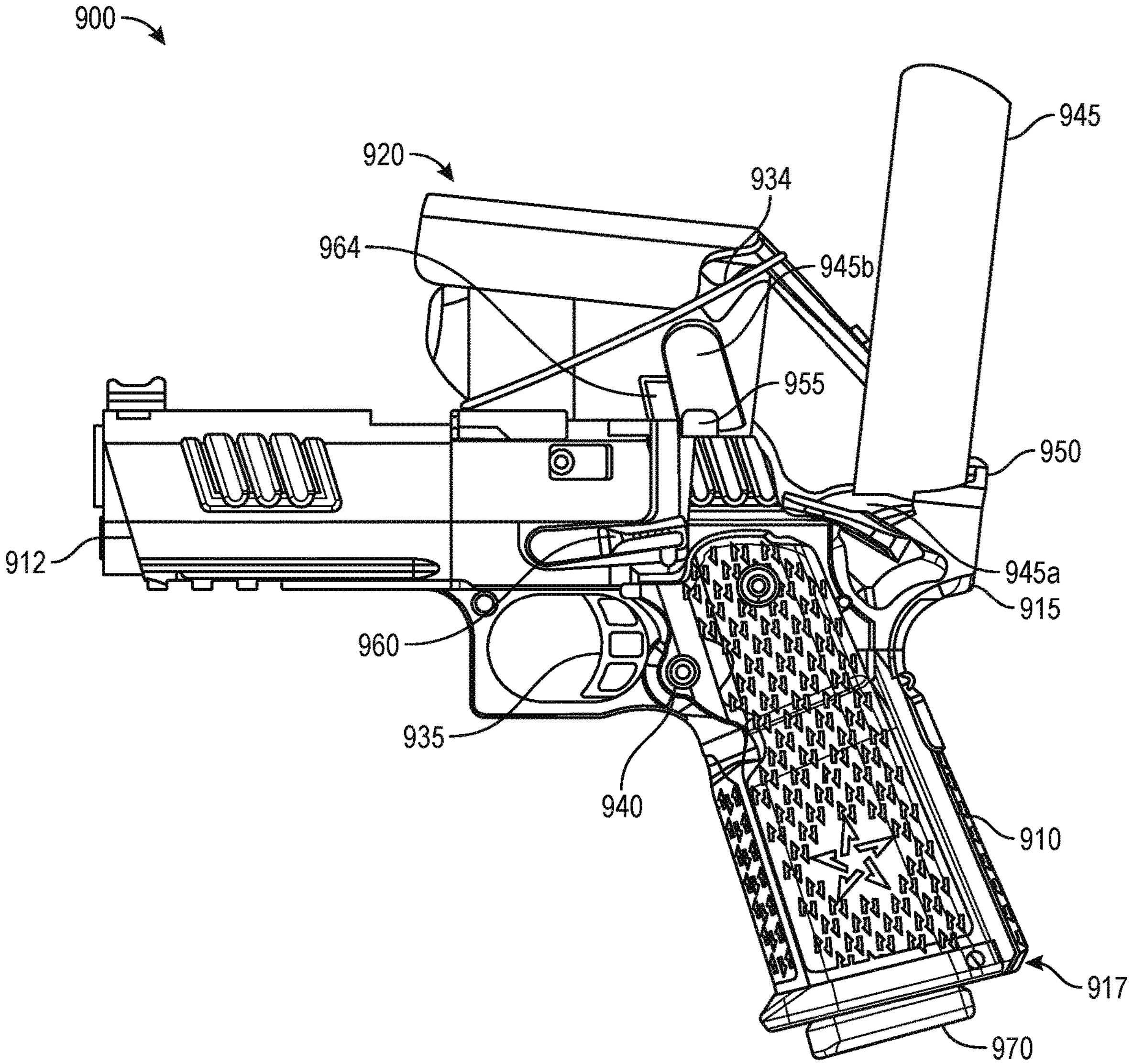

FIGS. 9A and 9B are isometric and side views, respectively, of a handgun simulation assembly 900 of another embodiment of the present technology. The handgun simulation assembly 900 includes a handgun grip 910, a handgun barrel 912, a handgun body 915, a cradle subassembly 920, and a biasing member 934 (e.g., an elastic band) wrapped around the cradle subassembly 920. The handgun grip 910 includes a magazine release button 940 and a trigger blade (or “trigger”) 935 extending from the upper portion of the handgun grip 910. The handgun barrel 912 can house a recoil simulator (e.g., the recoil simulator 60). The handgun body 915 includes a slide release button 960 located adjacent to the trigger 935. The handgun grip 910, handgun barrel 912, handgun body 915, trigger 935, magazine release button 940, and slide release button 960 may be manufactured with similar materials, finish, and feel as might be found on operational handguns.

The handgun body 915 and the cradle subassembly 920 are configured to support a VR controller 945 manufactured by a third party, such as a Meta Quest Pro™, Meta Quest 2™, or Meta Quest 3™, sold by Meta Platforms, Inc., a Pico 4™ sold by Pico Immersive Pte. Ltd., or other similar controller. As will be described in additional detail herein, the cradle subassembly 920 includes an annular or ring-shaped component designed to fit around the handle of the VR controller 945 to secure one end of the VR controller 945. The other end of the VR controller 945 is secured by a lip member 950 formed on the handgun body 915. The VR controller 945 typically has a trigger finger button 945*a* disposed on the front of the VR controller and operated by the index finger of a user, and a side button 945*b* disposed on the side of the VR controller and operated by the thumb of the user.

As will be described with respect to FIGS. 12A and 12B, in some embodiments, the handgun simulation assembly 900 also has a magazine release arm 955 and a slide release arm 964 that extend upward to a position adjacent the side button 945*b*. The magazine release arm 955 and the slide release arm 964 translate a user’s pushing force on the magazine release button 940 and the slide release button 960, respectively, to a pushing force on the side button 945*b*. When paired with appropriate virtual reality application software, depressing the side button 945*b* may be interpreted to begin a reload process of the handgun within a virtual reality application.

As will be described with respect to FIGS. 13A and 13B, in some embodiments, the handgun simulation assembly 900 also has a magazine weight 970 that can drop upon depression of the magazine release button 940 to simulate the sensation of a real magazine drop. The magazine weight 970 can be stored at least partially inside the handgun grip 910, and the handgun grip 910 can be constructed with an opening 917 through which the magazine weight 970 protrudes, extends, and/or drops.

The handgun simulation assembly 900 advantageously allows a user to view and/or access the control panel (e.g., including a joystick and other input buttons) while holding the handgun simulation assembly 900, such as when pointing the handgun simulation assembly 900 forward during a VR gaming session. Moreover, while the illustrated embodiment depicts a left-handed controller, one skilled in the art will appreciate that select components of the handgun simulation assembly 900 described herein can be inverted and/or rearranged to support a right-handed controller.

While one configuration of the handgun simulation assembly 900 is depicted in FIGS. 9A and 9B, it will be appreciated that different configurations of the handgun simulation assembly may be manufactured to simulate the feel or configuration of different types of handguns or long guns. Different pistol grips, triggers, recoil simulators, etc. may be selected to mirror different physical gun types that are available in the real world, and different materials, finishes, and overall assembly weight may be selected to make the handgun simulation assembly closely approximate the feel of a physical gun. As such, the particular configuration depicted in FIGS. 9A and 9B is merely representative of how the handgun simulation assembly 900 might actually look.

Figure 10:
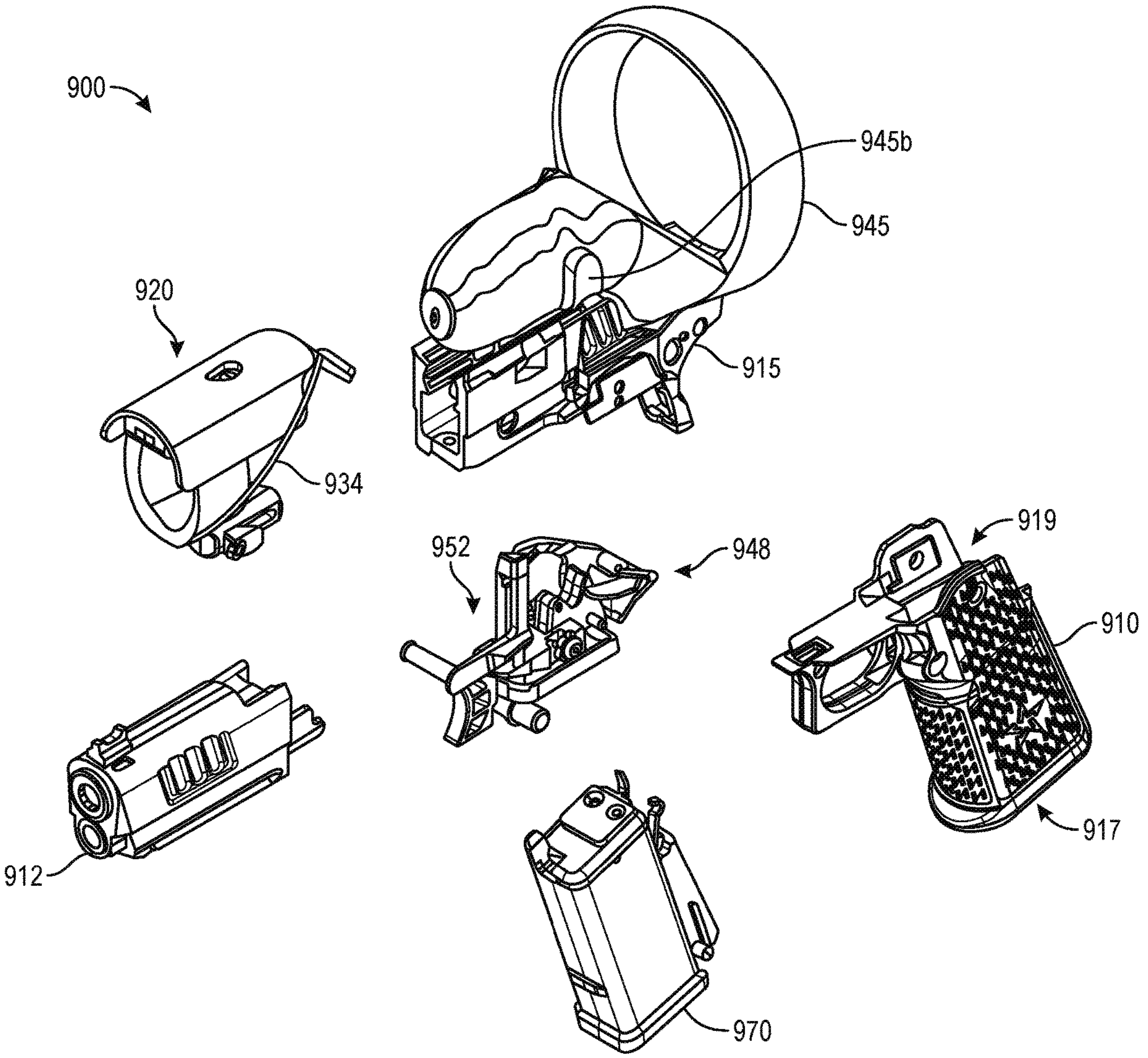
FIG. 10 is a partially exploded isometric view of the handgun simulation assembly of FIG. 9A.

FIG. 10 is a partially exploded isometric view of the handgun simulation assembly 900, depicting various components and subassemblies that are coupled to the handgun body 915. The handgun body 915 is coupled to the handgun barrel 912 at the front of the body 915 via a bolt or other fastener, and the body 915 is also coupled to the handgun grip 910 at the bottom via at least one bolt or other fastener. The grip 910 may include a compartment 919 for housing the magazine weight 970. By selection of different magazine weights 970, the weight and balance of the handgun simulation assembly 900 may be configured to match those of various different types of physical handguns or other firearms.

The handgun simulation assembly 900 includes a trigger translation subassembly 948, which can operate in a manner substantially the same as the trigger translation subassembly 300 described above with respect to FIGS. 3 and 4A-4C. Description of the trigger translation subassembly 948 is therefore omitted so as not to obscure the novel aspects of the handgun simulation assembly 900. The handgun simulation assembly 900 also includes a magazine and slide release subassembly 952, which includes the magazine release arm 955 and the slide release arm 964 (FIGS. 9A and 9B). The magazine and slide release subassembly 952, while disposed proximate the trigger translation subassembly 948, operates independently of the trigger translation subassembly 948 and is described in further detail with respect to FIGS. 12A and 12B.

Figure 11:
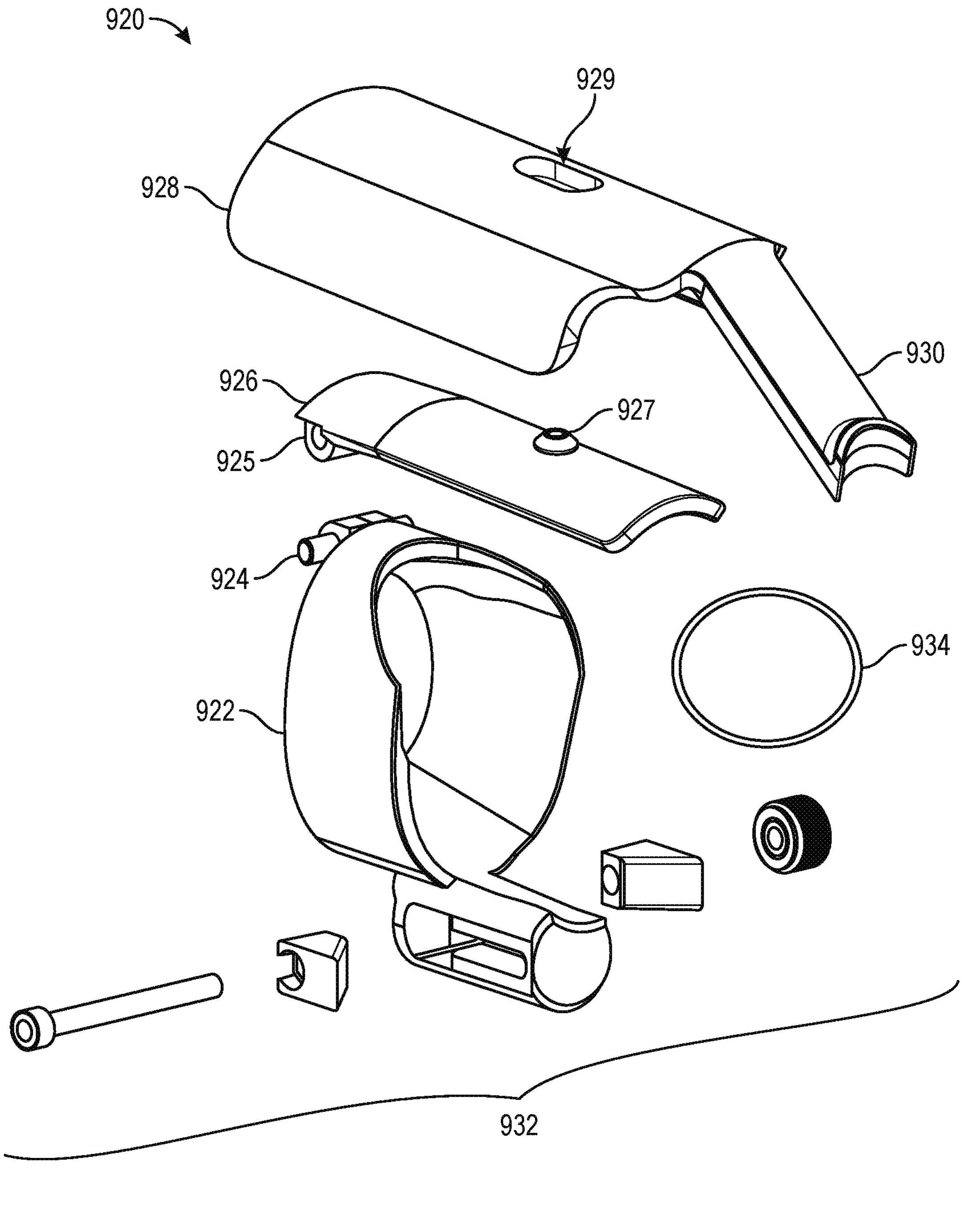
FIG. 11 is a partially exploded isometric view of a cradle subassembly of the handgun simulation assembly of FIG. 9A.

FIG. 11 is a partially exploded isometric view of the cradle subassembly 920. The cradle subassembly 920 includes a mating cradle 922, fasteners 932, a cradle cover 926, a sliding member 928, and the biasing member 934. The mating cradle 922 has an annulus configured to receive and hold the virtual reality controller 945 in a fixed position relative to the handgun body 915. The fasteners 932 are configured to releasably secure the mating cradle 922 to the handgun body 915 and the lip member 950. The mating cradle 922 and the fasteners 932 are shaped and operate substantially the same as the mating cradle 20 and the cradle locking subassembly 25, respectively, described above with respect to FIG. 5. A description of the mating cradle 922 and the fasteners 932 is therefore omitted so as not to obscure the novel aspects of the cradle subassembly 920. However, the mating cradle 922, unlike the mating cradle 20, includes a rod 924 configured to fit in an opening 925 of the cradle cover 926. When assembled, the rod 924 and the opening 925 form a hinge about which the cradle cover 926 can pivot relative to the mating cradle 922. The sliding member 928 has an aperture 929 configured to receive a protrusion 927 (e.g., a fastener) on the cradle cover 926, and an arm 930 that extends to a location adjacent a joystick of the virtual reality controller 945 when the virtual reality controller 945 has been seated in the mating cradle 922. The protrusion 927 and aperture 929 are sized such that the protrusion 927 can slide forwards (towards the handgun barrel 912) or backwards (towards the handgun grip 910) in the aperture 929. In the illustrated embodiment, the arm 930 includes a distal end with a curvature conforming to the shape of a virtual reality controller joystick.

When the cradle subassembly 920 is assembled, as shown in FIGS. 9A, 9B, and 10, the cradle cover 926 is disposed between the mating cradle 922 and the sliding member 928. The biasing member 934 can be positioned around the mating cradle 922 and the sliding member 928 (e.g., around the arm 930) to keep the sliding member 928 in a neutral (forward position) on the cradle cover 926. That is, the biasing member 934 pushes or pulls the sliding member 928 forward such that the protrusion 927 is located towards the end of the aperture 929 closest the arm 930. When securing the virtual reality controller 945 in the cradle subassembly 920, the cradle cover 926 and the sliding member 928 is pivoted about the rod 924 to a vertical orientation, the virtual reality controller 945 is inserted into the annulus of the mating cradle 922, and the cradle cover 926 and the sliding member 928 can then be pivoted back to the horizontal orientation (as shown in FIGS. 9A and 9B).

When the handgun simulation assembly 900 is in use (e.g., used for playing a VR shooting game), the sliding member 928 can be pulled by a user to simulate a manual slide release. The sliding member 928 is moveable between the neutral position and a pulled position. When in the neutral position, the sliding member 928 is at a position relative to the mating cradle 922 as illustrated in FIGS. 9A, 9B, and 10, whereby the protrusion 927 is located towards the end of the aperture 929 closest the arm 930. In the neutral position, the arm 930 does not push against the joystick of the virtual reality controller 945. When in the pulled position, the sliding member 928 is at a more rearward position whereby the protrusion 927 is located towards the end of the aperture 929 farthest from the arm 930. In the pulled position, the arm 930 pushes against the joystick of the virtual reality controller 945. The biasing member 934 is configured to bias the sliding member 928 towards the neutral position such that once the user pulls the sliding member 928 to the pulled position and then releases the sliding member 928, the sliding member 928 automatically returns to the neutral position by application of a return force by the biasing member 934. In some embodiments, the fastener 927 and the aperture 929 define a maximum displacement of the sliding member 928 relative to the mating cradle 922 when the sliding member 928 is moved between the neutral and pulled positions. The maximum displacement can be set to prevent damage to the joystick of the virtual reality controller 945, which can result if the sliding member 928 is moved too far rearward.

Figure 12B:
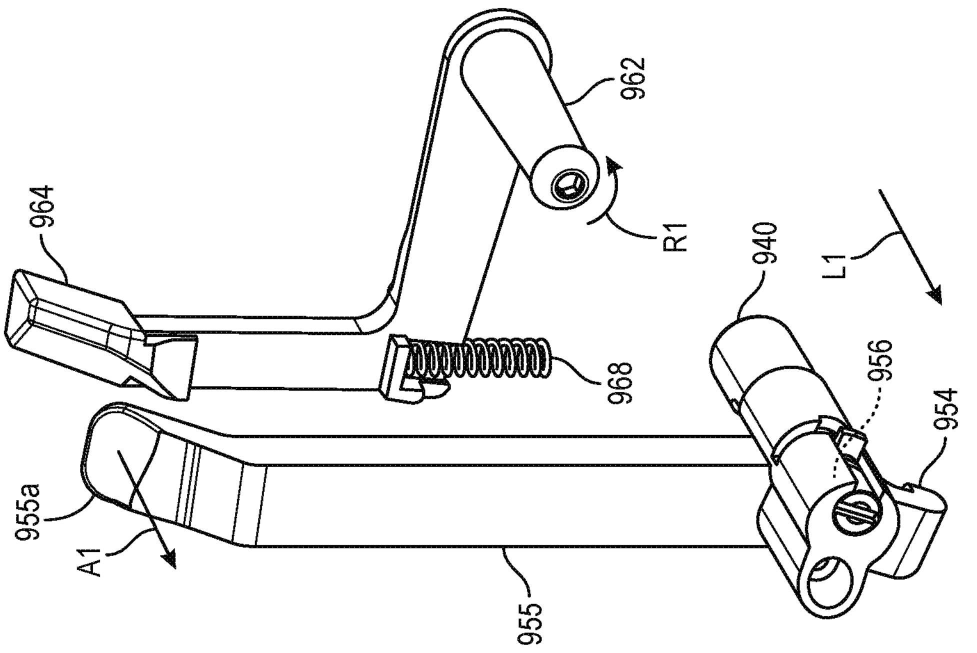
FIGS. 12A and 12B are front isometric and rear isometric views, respectively, of a magazine and slide release subassembly of the handgun simulation assembly of FIG. 9A.
Figure 12A:
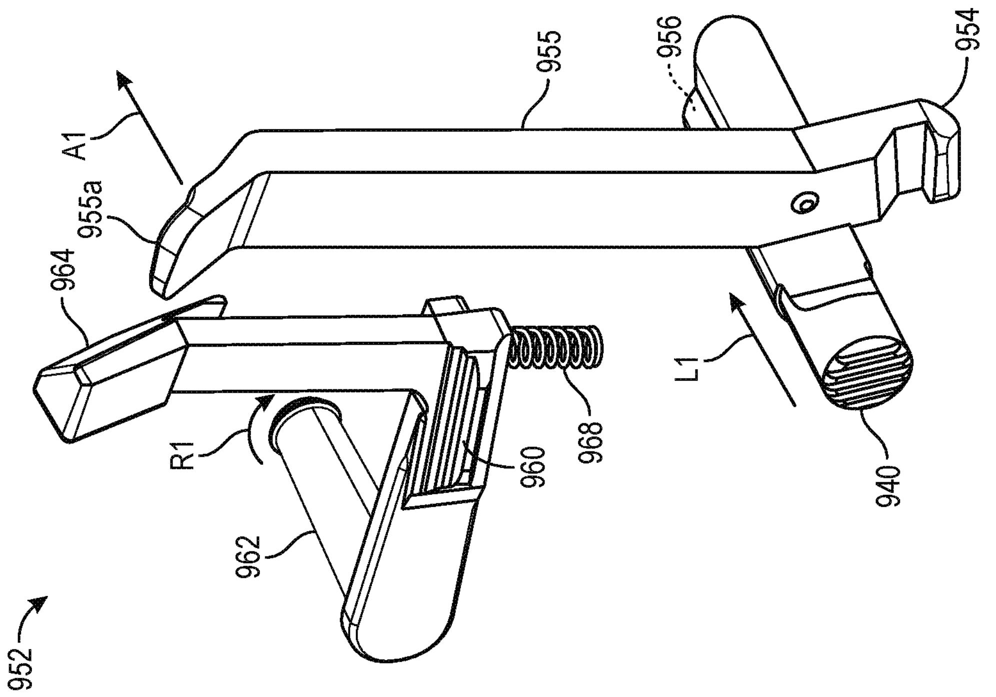

FIGS. 12A and 12B are front isometric and rear isometric views, respectively, of the magazine and slide release subassembly 952. The subassembly 952 includes the slide release button 960, the slide release arm 964 coupled to the slide release button 960, a first biasing member 968 (e.g., a compression spring) disposed between the slide release button 960 and the handgun body 915, the magazine release button 940, the magazine release arm 955 coupled to the magazine release button 940, and a second biasing member 956. A lower portion of the magazine release arm 955 can include a hook 954, which will be described in further detail below with respect to FIGS. 13A and 13B.

The slide release arm 964 and the magazine release arm 955 both extend to locations adjacent the side button 945*b* of the virtual reality controller 945. The slide release button 960 is rotatably coupled to the handgun body 915 via shaft 962, and is moveable between a neutral position and a depressed position (e.g., via rotation in direction R1) when a downward force is applied on release button 960. The magazine release button 940 is also moveable between a neutral position and a depressed position (e.g., via linear motion L1) when an inward force is applied to release button 940. The magazine release button 940, the magazine release arm 955, and the second biasing member 956 are shaped and operate substantially the same as the magazine release translation subassembly 800 illustrated and described above with respect to FIGS. 8A and 8B. Description of the magazine release button 940, the magazine release arm 955, and the second biasing member 956 is therefore omitted so as not to obscure the novel aspects of the subassembly 952.

When the handgun simulation assembly 900 is in use (e.g., used for playing a VR shooting game), the magazine release button 940 can be pressed by a user to simulate a magazine release. As described above with respect to FIGS. 8A and 8B, pressing the magazine release button 940 fully (i.e., via linear motion L1) causes a first distal end 955*a* of the magazine release arm 955 to move inward (e.g., via linear motion A1) and push on the side button 945*b* of the virtual reality controller 945 by a first depression level. When pressure on the magazine release button 940 is removed, the second biasing member 956 returns the magazine release button 940 back to the neutral position. The slide release button 960 can be pressed down by a user to simulate a manual slide release. Pressing the slide release button 960 fully causes the slide release arm 964 to push on the side button 945*b* of the virtual reality controller 945 by a second depression level. In the depicted embodiment, the slide release arm 964 pushes against the side button 945*b* directly. In some embodiments, the slide release arm 964 pushes against the first distal end 955*a* of the magazine release arm 955 (i.e., the side release arm 964 overlaps with the first distal end 955*a* of the magazine release arm 955) in order to indirectly push against the side button 945*b*. The first biasing member 968 can be configured to bias the slide release button towards the neutral position.

The first depression level (corresponding to the magazine release button 940) can be set to be different than the second depression level (corresponding to the slide release button 960). For example, the maximum rotation angle of the slide release button 960 about the shaft 962 and/or the moment arm between the shaft 962 and the slide release arm 964 can be designed such that the first depression level is greater than the second depression level. When paired with appropriate virtual reality application software, depressing the side button 945*b* by the first depression level may be interpreted to release the magazine of the handgun within a virtual reality application, while depressing the side button 945*b* by the second depression level may be interpreted to release the slide of the handgun within the virtual reality application. In some embodiments, the second depression level is between 10% and 40% (e.g., 15%, 26%, 33%) of the first depression level. In some embodiments, to account for differences between different handgun simulation assemblies and/or virtual reality controllers, the virtual reality application software can run a calibration operation to measure the first and second depression levels by asking the user to fully press on the magazine release button 940 and the slide release button 960 independently. As the user presses each button, the application software reads the corresponding first depression level and the second depression level. The application software uses the read depression amounts to set the corresponding threshold that will be used to determine whether the magazine release button 940 or slide release button 960 were subsequently pressed.

Figure 13A:
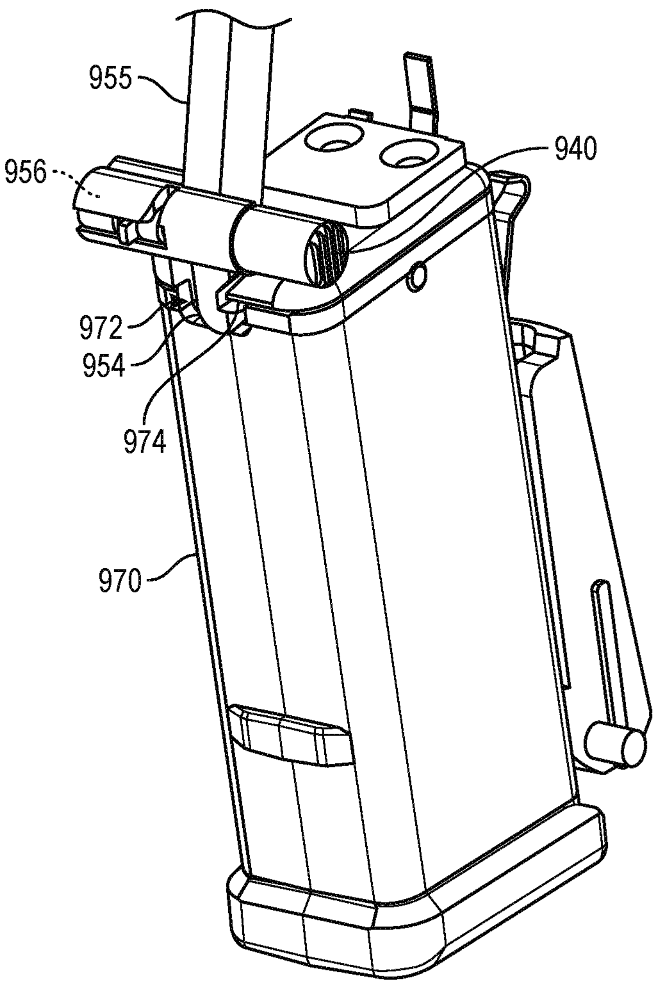
FIGS. 13A and 13B are isometric and side views, respectively, of a magazine weight of the handgun simulation assembly of FIG. 9A.
Figure 13B:
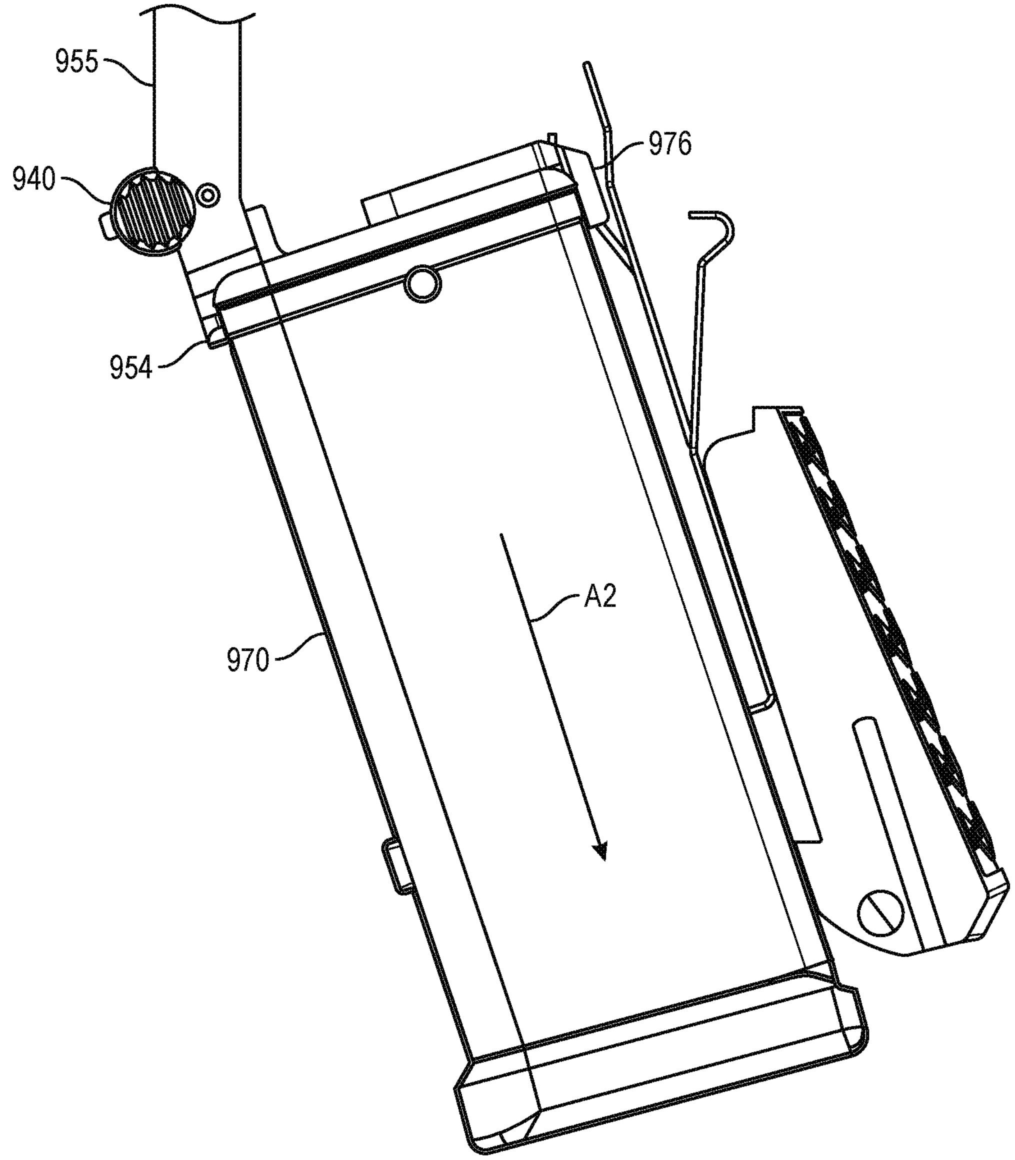

FIGS. 13A and 13B are isometric and side views, respectively, of the magazine weight 970. As discussed above with respect to FIGS. 12A and 12B, the lower portion of the magazine release arm 955 includes hook 954. An upper portion of the magazine weight 970 includes a recess 972 configured to receive the hook 954 and a lip 974 configured to contact and engage the hook 954. When the magazine release button 940 is in the neutral position, as shown in FIG. 13A, the hook 954 engages the lip 974 to suspend the magazine weight 970 within the handgun grip 910 (shown in FIG. 13C) in an engaged position. When the magazine release button 940 is moved to the depressed position, the magazine release arm 955 is translated horizontally such that the hook 954 moves away from the lip 974 while the magazine weight 970 remains stationary due to the inner walls of the handgun grip 910. As a result, when the magazine release button 940 is in the depressed position, the hook 954 no longer engages the lip 974 and the magazine weight 970 is able to fall (due to gravity) through the handgun grip 910 in direction A2 (FIG. 13B).

Figure 13C:
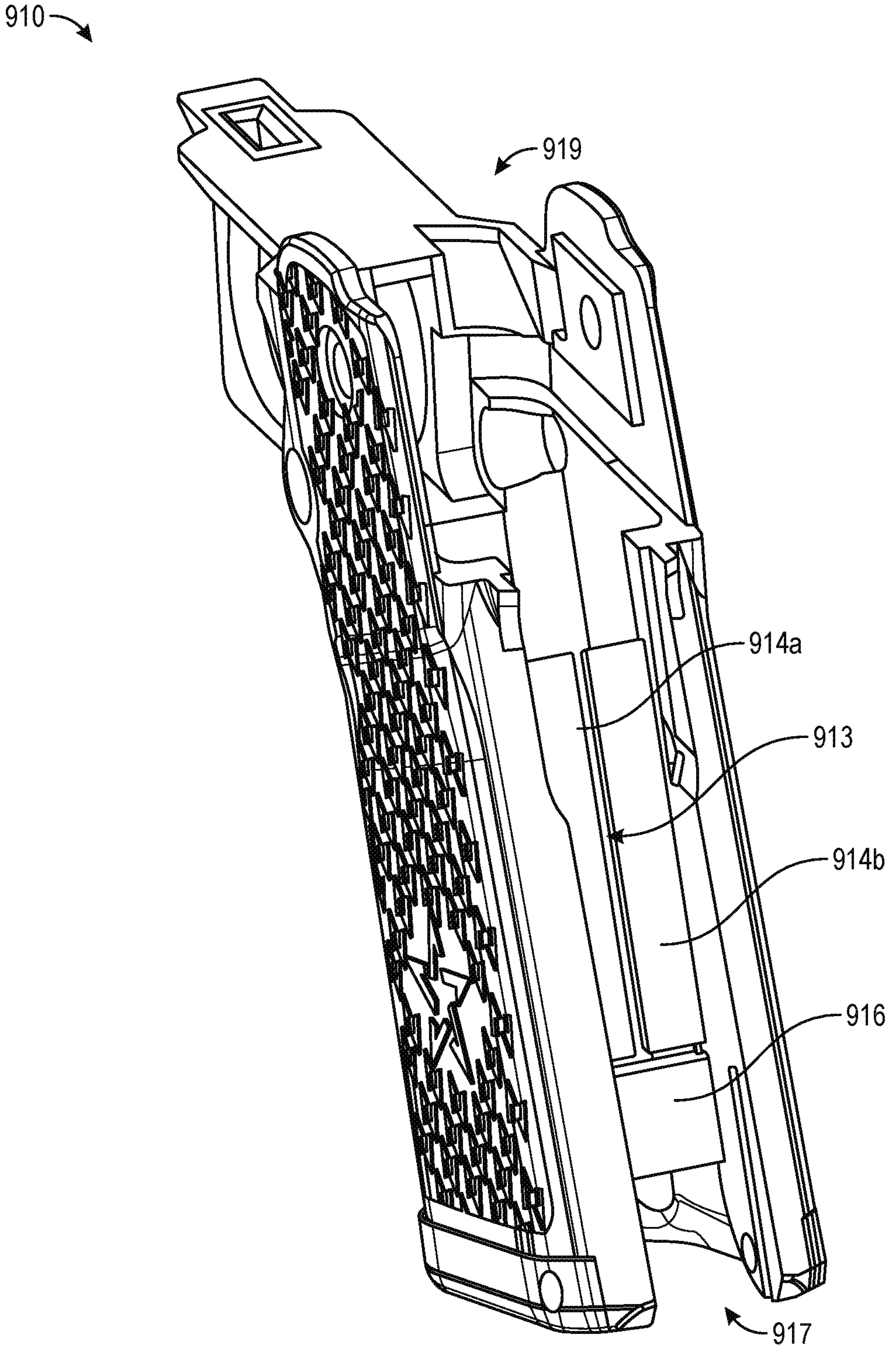
FIG. 13C is a rear isometric view of a handgun grip of the handgun simulation assembly of FIG. 9A.

FIG. 13C is a rear isometric view of the handgun grip 910. The compartment 919 is at least partially defined by a first guiding portion 914*a*, a second guiding portion 914*b*, and a stopper 916. In the illustrated embodiment, the first and second guiding portions 914*a*, 914*b* are separated by a distance to define a gap 913 in between. The magazine weight 970 slides into compartment 919 of the handgun grip 910. When the magazine release button 940 is depressed and the magazine weight 970 begins to fall, it slides downward through compartment 919 and opening 917. As the magazine weight 970 drops, a fin or tab 976 (FIG. 13B) coupled to a rear side of the magazine weight 970 slides downward through the gap 913. When the tab 976 reaches the stopper 916, the stopper 916 prevents the magazine weight 970 from falling beyond a predetermined distance. In other words, the action of tab 976 and stopper 916 prevents the magazine weight 970 from being removed from handgun grip 910. The handgun grip 910 can include other stopper mechanisms to prevent the magazine weight 970 from falling out of the handgun grip.

When the handgun simulation assembly 900 is in use (e.g., used for playing a VR shooting game), the drop of the magazine weight 970 simulates the feel of a real magazine drop. The mass of the magazine weight 970 and the predetermined distance of the drop can be configured to create a realistic sensation of a magazine drop. Also, by preventing the magazine weight 970 from fully dropping out of the compartment 919, the stopper 916 prevents any injury that may occur from the magazine weight 970 dropping (e.g., onto the user's foot) and facilitates returning the magazine weight 970 to its original position.

To reload a new magazine within a VR game, a user can simply tap or push the magazine weight 970 back up to its original position. The hook 954 can include a curvature that allows the lip 974 to push the hook 954 (and thus the magazine release arm 955) horizontally as the magazine weight 970 is pushed upward. Once the magazine weight 970 has returned to its original position, the second biasing member 956 causes the hook 954 to snap back to re-engage the lip 974, as shown in FIG. 13A. When paired with appropriate virtual reality application software, tapping or pushing the magazine weight 970 back upward can be detected via a built-in sensor (e.g., an accelerometer) of the virtual reality controller 945 and can be interpreted as a new magazine reload within the VR game.

Figure 14:
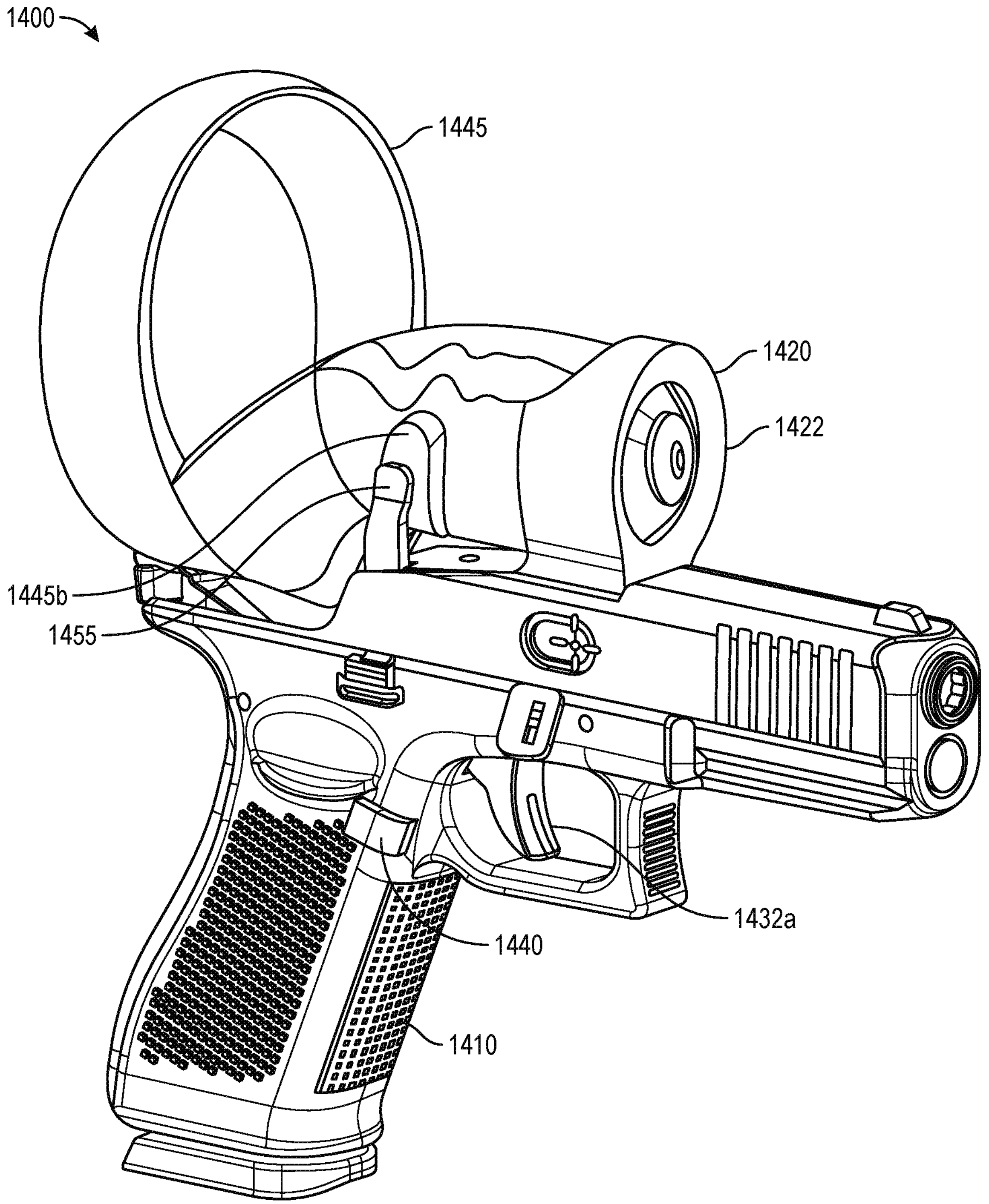
FIG. 14 is an isometric view of a firearm simulation assembly of an embodiment of the present technology.

FIG. 14 is an isometric view of a firearm simulation assembly 1400 of an embodiment of the present technology. The firearm simulation assembly 1400 includes a firearm assembly frame 1422, a swappable firearm body 1410 that releasably couples to the firearm assembly frame 1422, a trigger 1432*a*, and a magazine release button 1440 slidably coupled to the swappable firearm body 1410. The firearm assembly frame 1422 has an annular portion 1420 configured to engage and support a virtual reality controller 1445 manufactured by a third party, such as a Meta Quest Pro™, Meta Quest 2™, or Meta Quest 3™, sold by Meta Platforms, Inc., a Pico 4™ sold by Pico Immersive Pte. Ltd., or other similar controller. The firearm simulation assembly 1400 also includes a magazine release arm 1455 operably coupled to the magazine release button 1440 and extending to a location adjacent a side button 1445*b* of the virtual reality controller 1445.

The firearm simulation assembly 1400 advantageously allows a user to view and/or access the control panel (e.g., including a joystick and other input buttons) while holding the handgun simulation assembly 1400, such as when pointing the firearm simulation assembly 1400 forward during a VR gaming session. Moreover, while the illustrated embodiment depicts a right-handed controller, one skilled in the art will appreciate that select components of the firearm simulation assembly 1400 described herein can be inverted and/or rearranged to support a left-handed controller.

Figure 15:
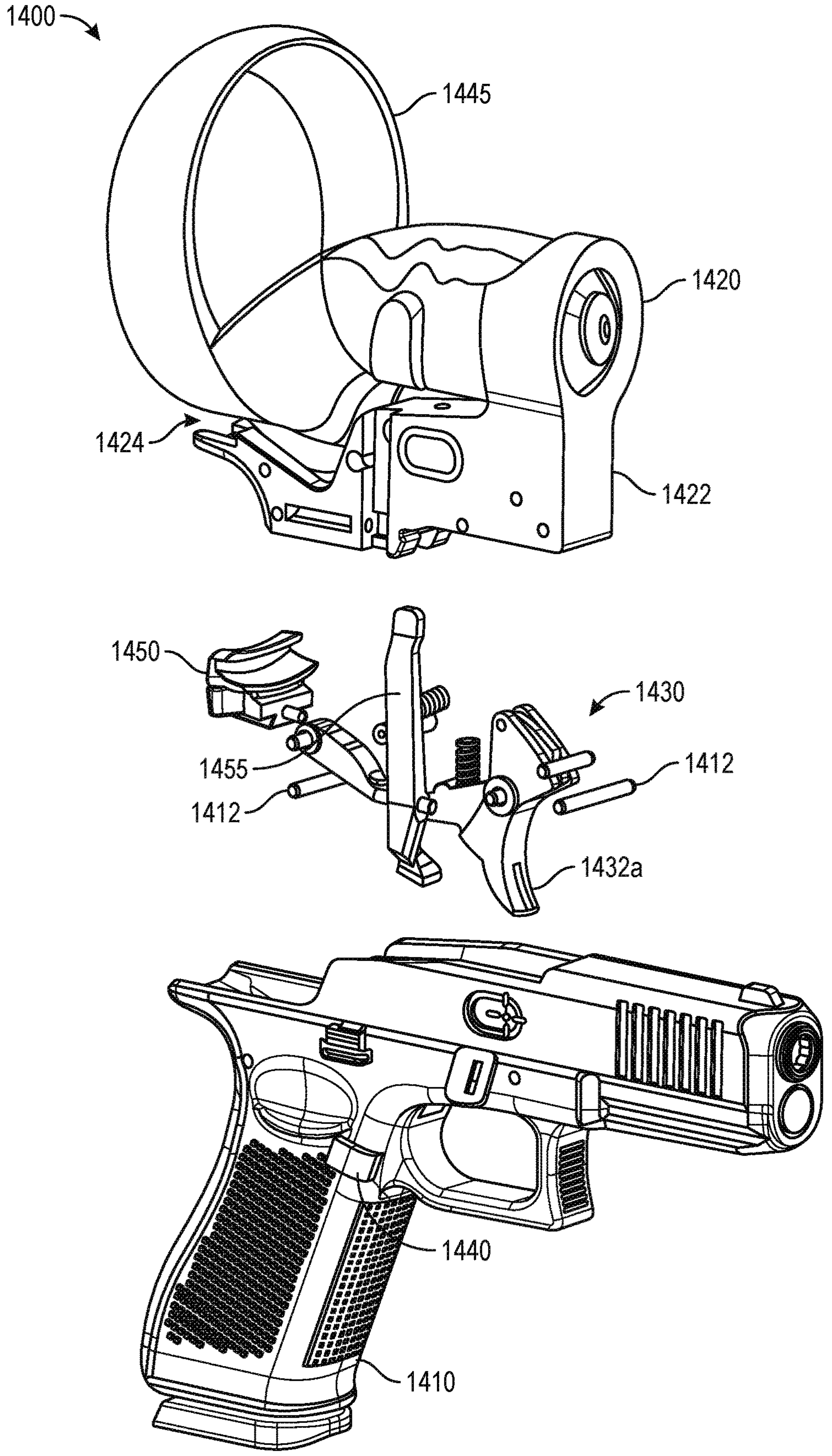
FIG. 15 is a partially exploded isometric view of the firearm simulation assembly of FIG. 14.

FIG. 15 is a partially exploded isometric view of the firearm simulation assembly 1400. The firearm simulation assembly 1400 also includes fasteners 1412, a lip member 1450, and a trigger translation subassembly 1430 positioned at least partially in the firearm assembly frame 1422 and the swappable firearm body 1410. The fasteners 1412 are configured to releasably couple the swappable firearm body 1410 to the firearm assembly frame 1422. That is, the fasteners 1412 are insertable through corresponding holes in the firearm assembly frame 1422 and the swappable firearm body 1410 to couple the frame 1422 to the body 1410. The lip member 1450 is used to engage and support the virtual reality controller 1445 on a rear portion 1424 opposite the annular portion 1420 of the firearm assembly frame 1422. The operation of the lip member 1450 is described in further detail below with respect to FIGS. 16A and 16B. The trigger translation subassembly 1430 includes the trigger 1432*a*. The components and operation of the trigger translation subassembly 1430 are described in further detail below with respect to FIGS. 17A-17C.

While the swappable firearm body 1410 in the illustrated embodiment has a shape corresponding to a handgun, other swappable firearm bodies can have shapes corresponding to other types of firearms (e.g., rifles, shotguns, etc.). When the firearm simulation assembly 1400 is in use (e.g., used for playing a VR shooting game), the swappable firearm body 1410 can be replaced with another to match the type of firearm being used in within the VR game to provide a more realistic gaming experience. For example, if a user is shooting with a shotgun within the VR game, but is holding the pistol-shaped swappable firearm body 1410 illustrated in FIGS. 14 and 15, the differences between the two types of firearms (e.g., weight, balance, how they are held, degree of recoil) can lead to a detached VR experience. Therefore, it is advantageous to have various types of firearm bodies that can easily be swapped depending on the type of firearm being used within the VR game. Moreover, the firearm assembly frame 1422 can continue to engage and support the virtual reality controller 1445 and the trigger translation subassembly 1430 (and other functional components) such that the user does not need to reconfigure and/or re-secure any other item (e.g., the virtual reality controller 1445) every time the swappable firearm body 1410 is replaced.

Figure 16A:
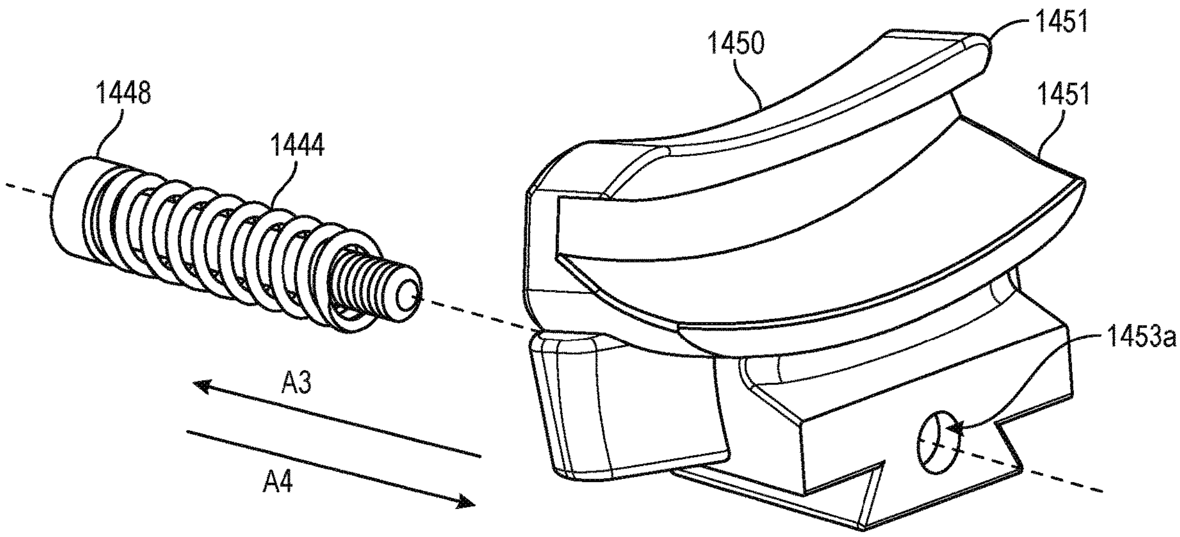
FIGS. 16A and 16B are partially exploded front and rear isometric views, respectively, of a lip member of the firearm simulation assembly of FIG. 14.
Figure 16B:
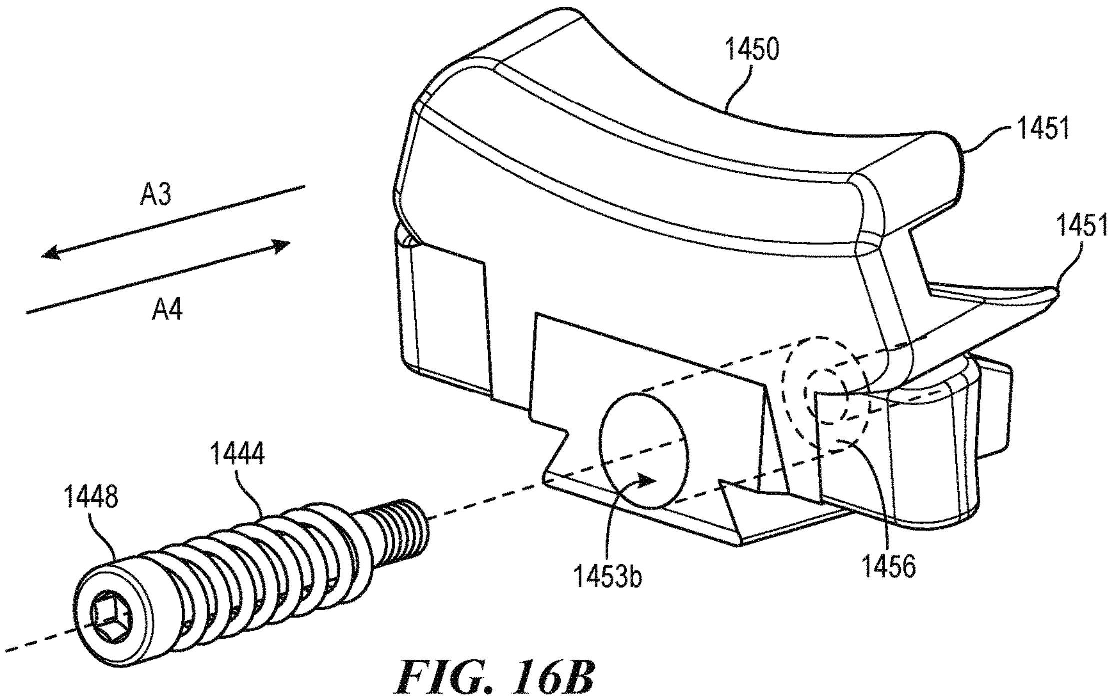

FIGS. 16A and 16B are partially exploded front and rear isometric views, respectively, of the lip member 1450 with corresponding fastener 1448 with a threaded end and biasing member 1444 (e.g., a spring). In the illustrated embodiment, the lip member 1450 includes two lip portions 1451 sized to receive an end of the virtual reality controller 1445. The lip member 1450 also includes a first opening 1453*a* and a second opening 1453*b* defining a channel extending therebetween along the illustrated dotted axis. The first opening 1453*a* has a smaller diameter than the second opening 1453*b* such that the channel includes a first channel portion closer to the first opening 1453*a*, and a second channel portion closer to the second opening 1453*b* and with a larger diameter than the first channel portion. The lip member 1450 includes an inner annular wall 1456 at the junction between the first and second channel portions and substantially normal to the illustrated dotted axis. The inner annular wall 1456 has an inner diameter corresponding to the first channel portion and an outer diameter corresponding to the second channel portion.

The diameter of the second opening 1453*b* is greater than that of the head of the fastener 1448 such that the second channel portion is sized to receive both the fastener 1448 and the biasing member 1444. When the firearm simulation assembly 1400 is assembled, the lip member 1450 is moveably coupled to the firearm assembly frame 1422 at the rear portion 1424 (FIG. 15) via fastener 1448. More specifically, the fastener 1448 is coupled to rear portion 1424 via the threaded end while the fastener 1448 is disposed in the channel and the biasing member 1444 is disposed in the first channel portion and compressed between the head of the fastener 1448 and the inner annular wall 1456.

The lip member 1450 is movable between a receiving position and a gripping position, and the biasing member 1444 biases the lip member 1450 towards the gripping position. The lip member 1450 is disposed closer to the firearm assembly frame 1422 when in the gripping position than in the receiving position. When a user is securing the virtual reality controller 1445 to the firearm assembly frame 1422, the virtual reality controller 1445 can be partially inserted into the annular portion 1420 of the firearm assembly frame 1422 and the user can manually pull the lip member 1450 away from the firearm assembly frame 1422 (e.g., in direction A3) to the receiving position. When doing so, the inner annular wall 1456 moves towards the head of the fastener 1448 while the fastener 1448 remains stationary relative to the firearm assembly frame 1422, thereby further compressing the biasing member 1444 therebetween. Once the virtual reality controller 1445 is in place, the user can release the lip member 1450 to allow the biasing member 1444 to push against the inner annular wall 1456 (e.g., in direction A4) and return the lip member 1450 to the gripping position, thereby securing the virtual reality controller 1445. The lip member 1450 allows the virtual reality controller 1445 to be easily inserted and removed, for example, when the virtual reality controller 1445 needs to be recharged.

Figure 17A:
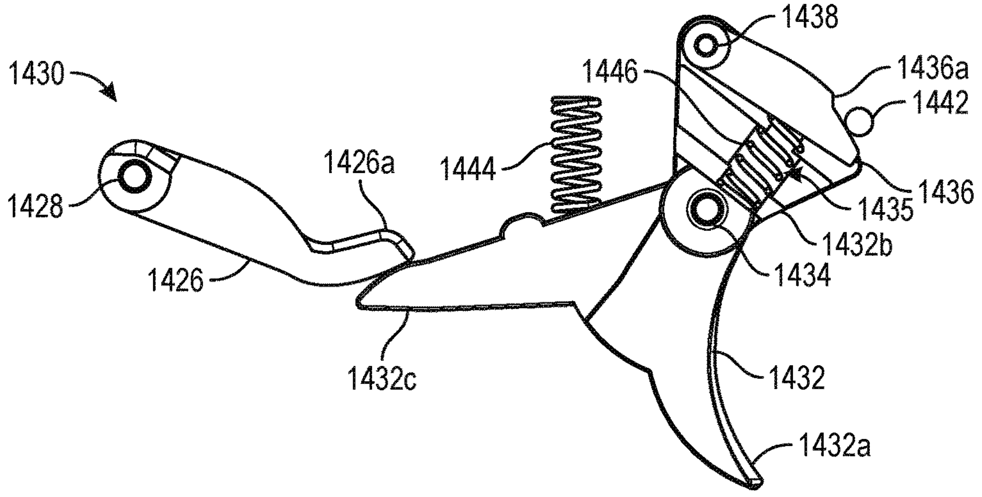
FIGS. 17A, 17B, and 17C are cross-sectional views of a trigger translation subassembly of the firearm simulation assembly of FIG. 14.
Figure 17B:
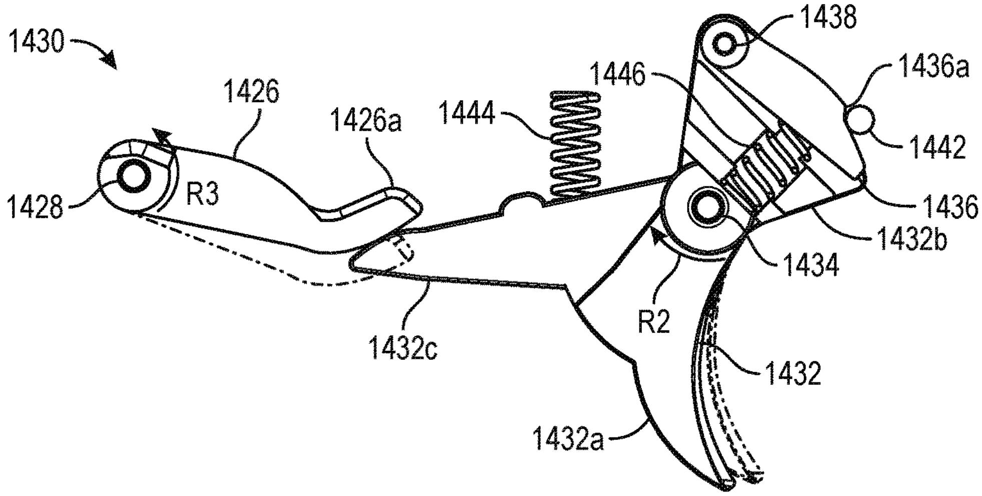
Figure 17C:
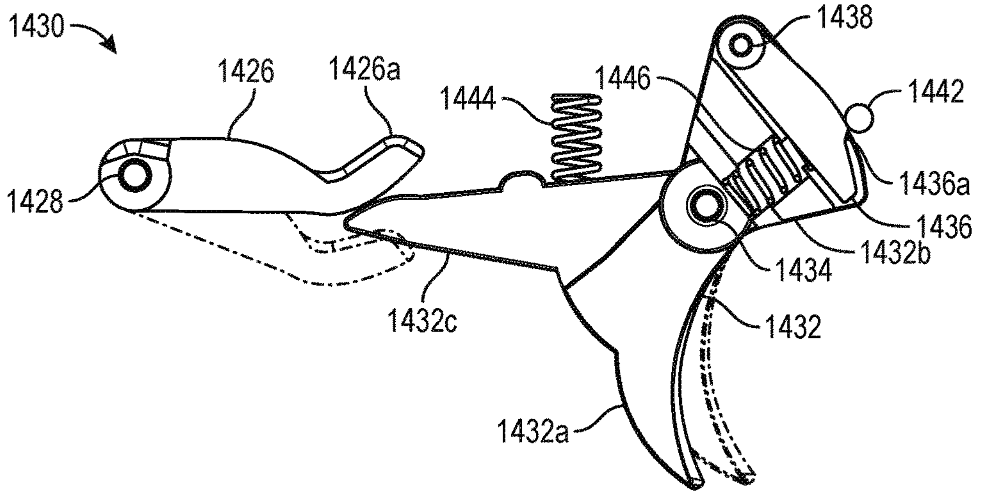

FIGS. 17A, 17B, and 17C are cross-sectional views of the trigger translation subassembly 1430. The subassembly 1430 includes a pusher arm 1426 rotatably coupled to the firearm assembly frame 1422, a pusher arm shaft 1428 around which the pusher arm 1426 rotates, a trigger cam 1432, and a trigger cam shaft 1434 affixed to the firearm assembly frame 1422 and around which the trigger cam 1432 rotates. A distal end 1426*a* of the pusher arm 1426 is positioned proximate the trigger finger button 1445*a* of the virtual reality controller 1445. The distal end 1426*a* of the pusher arm 1426 makes contact with and pushes against the trigger finger button of the virtual reality controller 1445. To improve detection of the force applied to the trigger finger button, the surface of the distal end 1426*a* of pusher arm 1426 may be coated with a thin aluminum or other conductive coating, since some VR controllers have capacitive sensors to distinguish between a touch by a human finger and a touch by an inanimate object. In other embodiments, the contact may be indirect. In either case, the trigger translation subassembly 1430 is configured to push on the trigger finger button of the VR controller 1445 as the trigger is pulled by the user.

The trigger cam 1432 includes a first portion comprising the trigger 1432*a*, a second portion 1432*b* having a cavity 1435, and a third portion 1432*c* that contacts the pusher arm 1426 near the distal end 1426*a*. The function of each portion of the trigger cam 1432 is described further below. The subassembly 1430 also includes a tensioning mechanism comprising a bar 1436, a first biasing member 1446 (e.g., a spring), and a fixture 1442. The bar 1436 is rotatably coupled to the second portion 1432*b* of the trigger cam 1432 via pin 1438, and the bar 1436 includes a notch 1436*a*. The first biasing member 1446 is coupled between the second portion 1432*b* proximate the trigger cam shaft 1434 and the bar 1436. The fixture 1442 is fixedly coupled to the firearm assembly frame 1422. The subassembly 1430 also includes a second biasing member 1444 (e.g., a spring) compressed between the trigger cam 1432 and the firearm assembly frame 1422.

FIGS. 17A, 17B, and 17C illustrate the subassembly 1430 in three different positions: an initial (neutral) position (FIG. 17A), an intermediate position (FIG. 17B), and a terminus (final, or pulled) position (FIG. 17C). FIG. 17A illustrates the subassembly 1430 when the trigger 1432*a* has not been pulled and is in its neutral position (e.g., as shown in FIG. 14). The fixture 1442 contacts the bar 1436 of the tensioning mechanism at a point approximately midway along the notch 1436*a*. The bar 1436 is biased against the fixture 1442 by the operation of first biasing member 1446, which applies a pushing force against the bar 1436. The fixture 1442 can be made out of a material that is wear resistant, such as stainless steel or Delrin™ manufactured by DuPont. In some embodiments, the pusher arm 1426 is not biased towards any direction such that the pusher arm 1426 rests on top of the third portion 1432*c* (e.g., by virtue of gravity). The second biasing member 1444 can bias the trigger cam 1432 towards the neutral position illustrated in FIG. 17A.

When a user wishes to fire the firearm simulation subassembly 1400, they pull on the trigger 1432*a* (e.g., using their index finger), causing the trigger cam 1432 to rotate in direction R2. FIG. 17B depicts the subassembly 1430 in an intermediate position, with the trigger 1432*a* having been pulled part way by the user. Due to coupling between the second portion 1432*b* of the trigger cam 1432 and the bar 1436 by the pin 1438, as well as the biasing applied by the first biasing member 1446, the bar 1436 is also moved along with the trigger cam 1432. As depicted in FIG. 17B, the bar 1436 of the tensioning mechanism has moved such that in the intermediate position, the fixture 1442 contacts the bar 1436 at a point further along notch 1436*a*. Due to the notch 1436*a* having an increased slope at the point of contact, a greater force is required by the user to move the trigger 1432*a*. The notch 1436*a* is shaped such that as the point of contact between the notch 1436*a* and the fixture 1442 changes, the required force to squeeze the trigger 1432*a* simulates the trigger resistance of a real handgun. In some embodiments, the notch 1436*a* has a shape different from the illustrated embodiment.

As the trigger cam 1432 rotates in direction R2, the third portion 1432*c* of the trigger cam 1432 is moved upward, pushing the distal end 1426*a* of the pusher arm 1426 upward and rotating the pusher arm 1426 in a counter-clockwise direction (e.g., in direction R3, rotationally opposite of R2). The distal end 1426*a* of the pusher arm 1426 pushes against the trigger finger button 1445*a* of the virtual reality controller 1445. The trigger finger button 1445*a* can make direct or indirect contact with the pusher arm 1426. In some embodiments, the surface of the distal end 1426*a* of the pusher arm 1426 is coated with a thin aluminum or other conductive coating, since some virtual reality controllers have capacitive sensors to distinguish between a touch by a human finger and a touch by an inanimate object. As depicted in FIG. 17B, the pusher arm 1426 rotates when the trigger 1432*a* is pulled. (The phantom pusher arm and the phantom trigger in FIG. 17B represent the original pusher arm and trigger positions, respectively, as seen in FIG. 17A.)

FIG. 17C depicts the subassembly 1430 in a terminus (final, or pulled) position, with the trigger 1432*a* having been fully pulled by a user. As depicted in FIG. 17C, the bar 1436 of the tensioning mechanism has moved such that in the final position, the fixture 1442 contacts the bar 1436 at a point outside of the notch 1436*a*. Once the fixture 1442 has finished travel past the notch 1436*a*, there is no further variance required by the user to move the trigger 1432*a*. Such a position simulates the feel of a trigger on a physical handgun after a shot has been fired. As also depicted in FIG. 17C, the pusher arm 1426 rotates even further compared to FIG. 17B when the trigger 1432*a* is fully pulled. (The phantom pusher arm and the phantom trigger in FIG. 17C represent the original pusher arm and trigger positions, respectively, as seen in FIG. 17A.) By adjusting the geometry of trigger cam 1432, depressing the trigger finger button 1445*a* via the distal end 1426*a* of the pusher arm 1426 is intended to trigger firing of the firearm within the VR game at or near the same time as the corresponding feel of the trigger 1432*a* changes. After pulling on the trigger 1432*a*, the user can then release the trigger 1432*a* such that the second biasing member 1444 rotates the trigger cam 1432 back to its neutral position, as shown in FIG. 17A.

Figure 18B:
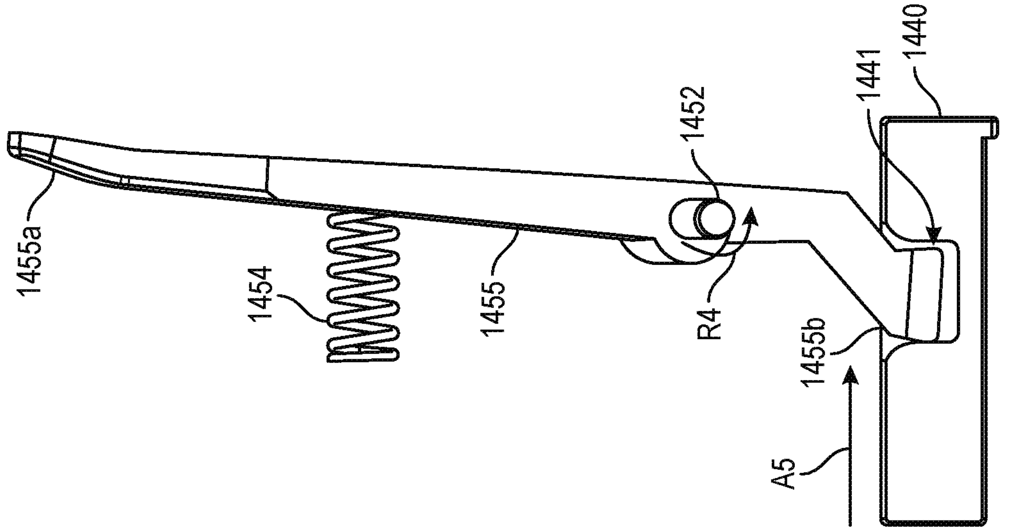
FIGS. 18A and 18B are front isometric and rear views, respectively, of a magazine release arm of the firearm simulation assembly of FIG. 14.
Figure 18A:
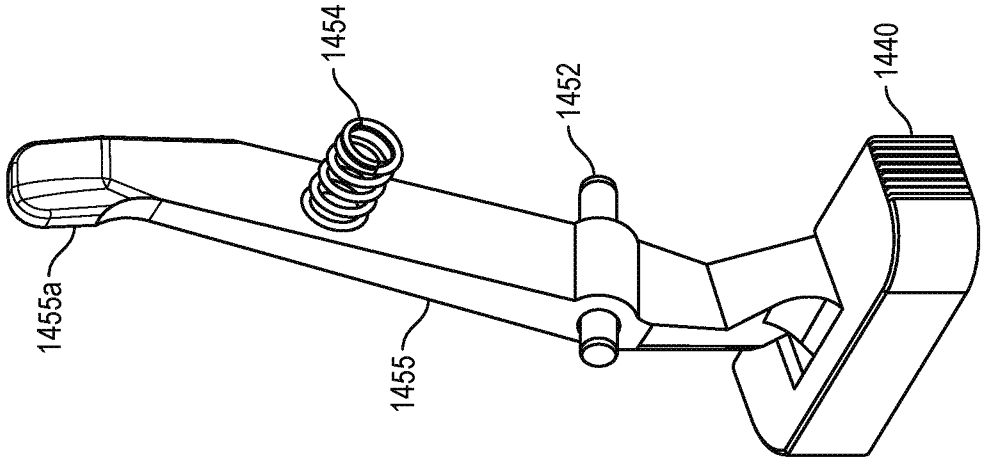

FIGS. 18A and 18B are front isometric and rear views, respectively, of the magazine release button 1440 and the magazine release arm 1455. The magazine release arm has the first distal end 1455*a* extending to a location adjacent the side button 1445*b* of the virtual reality controller 1445 and a second distal end 1455*b* proximate the magazine release button 1440. In the illustrated embodiment, the magazine release button includes a recess 1441 configured to receive the second distal end 1455*b* of the magazine release arm 1455. The magazine release arm 1455 is rotatably coupled to the firearm assembly frame 1422 via a shaft 1452 coupled between the first and second distal ends 1455*a*, 1455*b*. A biasing member 1454 (e.g., a spring) is coupled between the magazine release arm 1455 and the firearm assembly frame 1422.

When the firearm simulation assembly 1400 is in use (e.g., used for playing a VR shooting game), the magazine release button 1440 can be pressed by a user, causing the magazine release button 1440 to move from a neutral position to a depressed position, to simulate a magazine release. When pressed, the magazine release button 1440 is translated in direction A5 within the swappable firearm body 1410, pushing against the second distal end 1455*b* and exerting a moment on the magazine release arm 1455. The moment causes the magazine release arm 1455 to rotate about the shaft 1452 in direction R4 such that the first distal end 1455*a* moves towards and depresses the side button 1445*b* of the virtual reality controller 1445. When paired with appropriate virtual reality application software, depressing the side button 1445*b* may be interpreted to release the magazine of the firearm within a virtual reality application. When the user releases the magazine release button 1440, the biasing member 1454 pushes against the magazine release arm 1455 and returns the magazine release button 1440 to the neutral position.

The invention in its broader aspects is not limited to the specific details of the preferred embodiments shown and described, and it will be appreciated that variations and modifications can be made without departing from the scope of the invention. For example, while springs are typically disclosed as a biasing mechanism in the description, it will be appreciated that other biasing mechanisms such as rubber bumpers, rubber bands, or other mechanical equivalents could be used.

It will be apparent to those having skill in the art that changes may be made to the details of the above-described embodiments without departing from the underlying principles of the present disclosure. In some cases, well known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Reference herein to "one embodiment," "an embodiment," "some embodiments" or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment.

We claim:

1. A handgun simulation assembly for a virtual reality controller having a trigger finger button, the handgun simulation assembly comprising:

a handgun grip;

a handgun body coupled to the handgun grip, the handgun body having a trigger disposed on a lower portion and a channel formed on an upper portion; and a mating cradle comprising a lower portion configured to slide in the channel between an unengaged position and an engaged position and an upper portion configured to hold the virtual reality controller, such that when the mating cradle is in the engaged position a virtual reality controller is affixed to the handgun body in a horizontal orientation, with the trigger finger button of the virtual reality controller oriented downwardly towards the handgun grip and a control panel of the virtual reality controller accessible from a rear of the handgun body, and when in the unengaged position the virtual reality controller is separable from the handgun body.

2. The handgun simulation assembly of claim 1 wherein the lower portion of the cradle is formed with a cavity through which a cradle locking subassembly can extend, the cavity having a travelling portion and a locking portion.

3. The handgun simulation assembly of claim 2, further comprising a cradle locking subassembly, the cradle locking subassembly comprising:

an axle configured to move in the travelling portion of the cavity when the cradle is in the unengaged position and in the locking portion of the cavity when the cradle is in the engaged position;

a first wedge coupled to the axle and configured to make contact with the lower portion of the cradle when the cradle is in the engaged position;

a second wedge coupled to the axle and configured to make contact with the lower portion of the cradle when the cradle is in the engaged position; and a compression mechanism coupled to the locking axle, the compression mechanism tensioning the first and second wedges against the lower portion of the cradle when the cradle is in the engaged position.

4. The handgun simulation assembly of claim 3 wherein the axle is threaded and the compression mechanism is a threaded thumb nut.

5. The handgun simulation assembly of claim 3 wherein the lower portion of the cradle is formed with angled receiving faces to mateably engage the first wedge and the second wedge when the first and second wedges are biased by the compression mechanism.

6. The handgun simulation assembly of claim 1 wherein the upper portion of the cradle is sized to receive a handle portion of the virtual reality controller.

7. The handgun simulation assembly of claim 1 wherein the upper portion of the cradle has a ring shape.

8. The handgun simulation assembly of claim 1 wherein the handgun body further comprises a lip formed on the upper portion of the handgun body, the lip sized to receive an end of the virtual reality controller opposite a portion of the virtual reality controller engaged by the mating cradle.

9. The handgun simulation assembly of claim 1, further comprising a trigger translation subassembly for translating motion of the trigger to the trigger finger button, the trigger translation subassembly comprising:

a cam shaft coupled to the handgun body;

a cam rotatably mounted on the cam shaft, the cam comprising a first portion, a second portion, and a third portion, wherein the first portion of the cam makes contact with the trigger and the third portion of the cam makes contact with the trigger finger button of the virtual reality controller;

a tensioning mechanism coupled to the second portion of the cam, the tensioning mechanism comprising:

a bar having a notch, wherein the bar is rotatably coupled to the second portion of the cam;

a spring disposed between the cam and the bar; and a fixture coupled to the handgun body and making contact with the notch of the bar, wherein movement of the trigger by a user causes the cam to rotate around the cam shaft and depress the trigger finger button of the virtual reality controller, the tensioning mechanism generating resistance to the cam rotation.

10. The handgun simulation assembly of claim 1, further comprising a magazine release translation subassembly, the magazine release translation subassembly comprising:

a magazine release button on a side portion of the handgun body, wherein the magazine release button has a neutral position and a pushed position;

a spring that biases the magazine release button towards the neutral position; and an arm coupled to the magazine release button and extending to a location adjacent a side button of the virtual reality controller, wherein a distal end of the arm is configured to push on the side button of the virtual reality controller when the magazine release button is in the pushed position and to release the side button of the virtual reality controller when the magazine release button is in the neutral position.

11. A firearm simulation assembly for a virtual reality controller, the firearm simulation assembly comprising:

a firearm body having a grip;

a mating cradle attached to the firearm body and sized to receive a handle of a virtual reality controller; and a lip member sized to receive an end of the virtual reality controller opposite the handle, wherein the lip member is movable along an axis between a receiving position and a gripping position, wherein the lip member is disposed closer to the firearm body when in the gripping position than in the receiving position;

wherein the mating cradle allows a virtual reality controller to be affixed to the firearm body in a horizontal orientation when the lip member is in a gripping position, with a trigger finger button of the virtual reality controller oriented downwardly towards the firearm grip, and allows the virtual reality controller to be separated from the firearm body when the lip member is in the receiving position.

12. The firearm simulation assembly of claim 11 wherein the mating cradle has a ring shape.

13. The firearm simulation assembly of claim 11 wherein the lip member includes a channel and an inner annular wall, the firearm simulation assembly further comprising:

a fastener coupled to the firearm body and disposed at least partially in the channel of the lip member; and a biasing member disposed between the fastener and the inner annular wall, wherein the biasing member biases the lip member towards the gripping position.

14. The firearm simulation assembly of claim 13 wherein the biasing member is a spring.

15. The firearm simulation assembly of claim 11 wherein the assembly allows access to a control panel of the virtual reality controller from a rear of the firearm body.

16. A handgun simulation assembly, comprising:

a handgun body; and a cradle subassembly configured to releasably hold a virtual reality controller on the handgun body, the cradle subassembly comprising:

a mating cradle coupled to the handgun body, wherein the mating cradle is configured to engage the virtual reality controller and hold the virtual reality controller in a fixed position with respect to the handgun body, the virtual controller having a joystick for control of game play;

a sliding member coupled to the mating cradle and moveable between a neutral position and a pulled position, the sliding member having an arm extending to a location adjacent the joystick of the virtual reality controller; and a biasing member configured to bias the sliding member towards the neutral position, wherein the arm is configured to push on the joystick of the virtual reality controller when the sliding member is in the pulled position and to release the joystick of the virtual reality controller when the sliding member is in the neutral position.

17. The handgun simulation assembly of claim 16, further comprising a cradle cover disposed between the mating cradle and the sliding member, wherein the cradle cover is rotatably coupled to the mating cradle.

18. The handgun simulation assembly of claim 17, further comprising a fastener coupled to the cradle cover, wherein the sliding member includes an aperture configured to receive the fastener, and wherein the fastener and the aperture define a maximum displacement of the sliding member relative to the cradle cover when the sliding member is moved between the neutral position and the pulled position.

19. The handgun simulation assembly of claim 16, further comprising:

a lip member sized to receive an end of the virtual reality controller, wherein the lip member includes a channel and an inner annular wall, wherein the lip member is movable along an axis between a receiving position and a gripping position, wherein the lip member is disposed closer to the handgun body when in the gripping position than in the receiving position;

a fastener coupled to the handgun body and disposed at least partially in the channel of the lip member; and a second biasing member disposed between the fastener and the inner annular wall, wherein the second biasing member biases the lip member towards the gripping position.

20. The handgun simulation assembly of claim 16, further comprising:

a magazine release button slidably coupled to the handgun body; and a magazine release arm rotatably coupled to the handgun body, the magazine release arm having a first distal end extending to a location adjacent a side button of the virtual reality controller and a second distal end proximate the magazine release button;

wherein, when the magazine release button is moved from a neutral position to a depressed position, the magazine release button pushes against the second distal end and causes the magazine release arm to rotate such that the first distal end pushes the side button of the virtual reality controller.

* * * * *